US012755399B2

(12) United States Patent
Jatesiktat et al.

(10) Patent No.: US 12,755,399 B2
(45) Date of Patent: Oct. 6, 2026

(54) METHOD AND SYSTEM FOR GENERATING A TRAINING DATASET FOR KEYPOINT DETECTION, AND METHOD AND SYSTEM FOR PREDICTING 3D LOCATIONS OF VIRTUAL MARKERS ON A MARKER-LESS SUBJECT

(71) Applicant: Nanyang Technological University, Singapore (SG)

(72) Inventors: Prayook Jatesiktat, Singapore (SG); Wei Tech Ang, Singapore (SG); Wee Sen Lim, Singapore (SG); Bharatha Selvaraj, Singapore (SG)

(73) Assignee: Nanyang Technological University, Singapore (SG)

( * ) Notice: Subject to any disclaimer, the term of this patent is extended or adjusted under 35 U.S.C. 154(b) by 273 days.

(21) Appl. No.: 18/569,891

(22) PCT Filed: Jun. 10, 2022

(86) PCT No.: PCT/SG2022/050398
§ 371 (c)(1),
(2) Date: Dec. 13, 2023

(87) PCT Pub. No.: WO2022/265575
PCT Pub. Date: Dec. 22, 2022

(65) Prior Publication Data

US 2024/0169560 A1 May 23, 2024

(30) Foreign Application Priority Data

Jun. 14, 2021 (SG) ............................ 10202106342T

(51) Int. Cl.
*G06K 9/00* (2022.01)
*G06T 3/4007* (2024.01)
(Continued)

(52) U.S. Cl.
CPC ............ *G06T 7/246* (2017.01); *G06T 3/4007* (2013.01); *G06T 5/77* (2024.01); *G06T 7/80* (2017.01);
(Continued)

(58) Field of Classification Search
CPC ......... G06T 7/246; G06T 3/4007; G06T 5/77; G06T 7/80; G06T 2207/20044;
(Continued)

(56) References Cited

U.S. PATENT DOCUMENTS 10,445,930 B1 10/2019 Saylor et al.
10,936,902 B1 3/2021 Bagwell et al.
(Continued)

FOREIGN PATENT DOCUMENTS

CN 110020611 A 7/2019
CN 111476883 A 7/2020
(Continued)

OTHER PUBLICATIONS

Jatesiktat et al. ("Personalized Markerless Upper-Body Tracking with a Depth Camera and Wrist-Worn Inertial Measurement Units", IEEE, Published on 2018, pp. 3284-3289). (Year: 2018).*
(Continued)

*Primary Examiner* — Duy M Dang
(74) *Attorney, Agent, or Firm* — Troutman Pepper Locke LLP

(57) ABSTRACT

According to embodiments of the present invention, a method and system for generating a training dataset for keypoint detection are provided. The system includes an optical marker-based motion capture system to capture markers as 3D trajectories; and video cameras to simultaneously capture sequences of 2D images. Each marker is placed on a bone landmark or keypoint of a subject. The method, performed by a computer in the system, includes
(Continued)

projecting each trajectory to each image to determine a 2D location for each marker; interpolating a 3D position therefrom; generating a bounding box around the subject; and generating the training dataset including at least one image, and the determined 2D location of each marker and the bounding box therein. According to further embodiments, a method and system for predicting 3D locations of virtual markers on a marker-less subject using a neural network trained by the generated training dataset are also provided.

19 Claims, 6 Drawing Sheets

(51) Int. Cl.

| | |
|---|---|
| ***G06T 5/77*** | (2024.01) |
| ***G06T 7/246*** | (2017.01) |
| ***G06T 7/80*** | (2017.01) |
| ***G06V 10/25*** | (2022.01) |
| ***G06V 10/60*** | (2022.01) |

(52) U.S. Cl.
CPC .............. *G06V 10/25* (2022.01); *G06V 10/60* (2022.01); *G06T 2207/20044* (2013.01); *G06T 2207/30241* (2013.01); *G06V 2201/07* (2022.01)

(58) Field of Classification Search
CPC . G06T 2207/30241; G06T 2207/20081; G06T 2207/30196; G06T 2207/30204; G06T 2207/20084; G06T 7/292; G06T 7/55; G06T 7/73; G06T 2207/10016; G06T 2207/10024; G06T 2207/20016; G06T 2207/20076; G06V 2201/07; G06V 10/25; G06V 10/60; G06V 10/82; G06V 20/647; G06V 30/18143; G06V 40/23; G06V 10/774; G06N 3/045; G06N 3/0475; G06N 3/094
See application file for complete search history.

(56) References Cited

U.S. PATENT DOCUMENTS

| | | | | |
|---|---|---|---|---|
| 2008/0112592 | A1* | 5/2008 | Wu ........................ | G06V 40/10<br>382/103 |
| 2018/0322680 | A1* | 11/2018 | Mcelmurray .......... | G06V 20/40 |
| 2020/0033444 | A1 | 1/2020 | Marsch | |

FOREIGN PATENT DOCUMENTS

| | | | |
|---|---|---|---|
| JP | 2021-105887 | A | 7/2021 |
| WO | 2020/054442 | A1 | 3/2020 |
| WO | 2022/093655 | A1 | 5/2022 |
| WO | 2022/191140 | A1 | 9/2022 |

OTHER PUBLICATIONS

Vafadar S. et al., A novel dataset and deep learning-based approach for marker-less motion capture during gait. Gait and Posture, Mar. 6, 2021, vol. 86, pp. 70-76; [Retrieved on Jan. 19, 2023] <DOI: 10.1016/J.GAITPOST.2021.03.003> Sections 2.1-2.3, 2.6-2.7, Figures 1 & 2.

Zhao Z. et al., Estimating 6d pose from localizing designated surface keypoints. arXiv preprint arXiv:1812.01387, Dec. 4, 2018 [Retrieved on Jan. 19, 2023] <DOI: 10.48550/arXiv.1812.01387 > Section 3.1 second paragraph.

International Search Report and Written Opinion mailed Jan. 26, 2023 for International Patent Application No. PCT/SG2022/050398, which was filed Jun. 10, 2022 (Applicant: Nanyang Technological University // Inventor: Prayook Jatesiktat) (13 pages).

* cited by examiner

METHOD AND SYSTEM FOR GENERATING A TRAINING DATASET FOR KEYPOINT DETECTION, AND METHOD AND SYSTEM FOR PREDICTING 3D LOCATIONS OF VIRTUAL MARKERS ON A MARKER-LESS SUBJECT

CROSS-REFERENCE TO RELATED APPLICATION

This application is a national stage entry application under 35 U.S.C. § 371 that claims the benefit of priority of PCT patent application no. PCT/SG2022/050398, filed 10 Jun. 2022, which claims priority to Singapore patent application no. 10202106342T, filed 14 Jun. 2021. The content of both applications being hereby incorporated by reference in their entirety for all purposes.

TECHNICAL FIELD

Various embodiments relate to a method and system for generating a training dataset for keypoint detection, as well as a method and system predicting 3D locations of virtual markers on a marker-less subject (for example, a human, an animal or an object) using a neural network trained by the generated training dataset.

BACKGROUND

The ability to sense and digitize kinematics of human movement has unlocked research and applications in many areas such as movement analysis in sport sciences, anomaly diagnosis in rehabilitation, character animation in the movie industry, or it can serve the purpose of human-computer interaction in video games, interactive arts, or different kinds of computer applications. Technologies that provide such ability may be in various forms. One early off-the-shelf technology that is still widely used to-date is in the multi-camera marker-based motion capture form. In this technology, a subject's bone landmarks are attached with retro-reflective markers that are seen by infrared cameras with active infrared light sources. When one marker is seen by more than one infrared camera, the 3-dimensional (3D) position of the marker is calculated from triangulation given that those infrared cameras are calibrated and synchronized. Then, the sequence of these 3D positions is used in subsequent applications.

Since the introduction of a deep convolutional neural network (AlexNet) in 2012 for image classification, many more complex computer vision problems have been approached in a similar way under the data-driven paradigm after that. One of the challenges encountered is human pose estimation or human keypoint detection. The neural network models in this field evolved rapidly in the past decade due to the popularity of the model-centric approach. Scientists normally downloaded available public datasets and proposed a new neural network architecture or a new training method that may improve the test accuracy over the existing models. Whilst this trend led to many notable contributions to the model(s), not many contributions were made to the dataset and the data quality. In the field of human keypoint detection, the two biggest data collection efforts are from COCO and MPII datasets with 118K and 40K images respectively. These datasets contain hand-annotated 2-dimensional (2D) joint positions for every human in the dataset. For example, in the COCO dataset, all keypoints are annotated by hand through crowdsourcing. To the best of the inventors' knowledge, all the state-of-the-art data-driven human keypoint detection models rely on these hand-annotated datasets for learning regardless of the annotated accuracy.

The task of picking a pixel on a high-resolution image to represent a joint center is difficult to perform accurately by a human due to various possible issues. The main reason is that there is no clear agreement of definition among the annotation workers of where exactly each joint center is relative to the actual human bone landmarks. Even if the definition is provided, it remains significantly hard to find as the 2D image may not provide sufficient clue about those bone landmarks. Therefore, the annotated position is more like a blurred 2D area instead of a pinpoint location to the pixel level. Using these datasets certainly limit how accurate the trained model can be. This level of quality may be adequate for entertainment purposes such as video game control, or interactive arts. However, for more contentious applications like sport sciences, biomechanical analysis, or rehabilitative analysis, such level of quality is more often not found suitable or sufficient.

In another existing approach, a Kinect skeletal tracking system works with depth images. Human model with random pose may be created in 3D. Random forest regression is used to predict every single pixel to determine every human part. However, accuracy of such synthetic model is not impressive as constraints used may not be real.

There is therefore a need for a method and/or system to address at least the problems mentioned above, more specifically, where the system involves the use of multiple RGB cameras and the system and/or method produces 3D marker position output, but without any markers or sensors being placed on the subject's body. One obvious benefit of being markerless is the reduction of time and manpower in subject preparation which makes the motion capture (mocap) workflow more practical to unforeseen applications such as medical diagnosis. The method and/or system also does not involve over-limiting constraints.

Further, instead of continuing the model-centric trend, the method and/or system may involve a best state-of-the-art keypoint detection model, as acknowledged by players in the field, and a data-centric aspect of producing a dataset with the highest possible quality annotation. Such annotation must not come from human decisions but from accurate sensors like marker positions from a marker-based motion capture system. If the marker is correctly placed on a bone landmark, and a marker-based motion capture system can accurately retrieve the 3D trajectory of that marker, that can be, in turn, projected to the video frames to obtain pixel-accurate 2D ground truth for the training of keypoint detection. Data collection infrastructure has also been designed from the ground up to ensure that all the calibration and synchronization work under a relatively small budget. In addition, this may very well avoid or at least reduce inconsistent quality of camera calibration parameters and time synchronization used in obtaining existing dataset of similar type that can undesirably cause significantly large errors after projection. For example, based on cropped images from MoVi dataset with marker projections in 2D, the projections are found to be misaligned with the markers due to poor camera calibration and synchronization.

SUMMARY

According to an embodiment, a method for generating a training dataset for keypoint detection is provided. The method may be based on a plurality of markers captured by an optical marker-based motion capture system, each as a 3D trajectory, wherein each marker is placed on a bone landmark of a human or animal subject or a keypoint of an object, and the human or animal subject or the object substantially simultaneously captured by a plurality of colour video cameras over a period of time as sequences of 2D images. The method may include for each marker, projecting the 3D trajectory to each of the 2D images to determine a 2D location in each 2D image; for each marker, based on the respective 2D locations in the sequences of 2D images and an exposure-related time of the plurality of colour video cameras, interpolating a 3D position for each of the 2D images; for each 2D image, based on the respective interpolated 3D positions of the plurality of markers and an extended volume derived from two or more of the markers having an anatomical or functional relationship with one another, generating a 2D bounding box around the human or animal subject or the object; and generating the training dataset comprising at least one 2D image selected from the sequences of 2D images, the determined 2D location of each marker in the selected at least one 2D image, and the generated 2D bounding box for the selected at least one 2D image.

According to an embodiment, a method for predicting 3D locations of virtual markers on a marker-less human or animal subject or a marker-less object is provided. The method may include based on the marker-less human or animal subject or the marker-less object captured by a plurality of colour video cameras as sequences of 2D images, for each 2D image captured by each colour video camera, predicting, using a trained neural network, a 2D bounding box; for each 2D image, generating, by the trained neural network, a plurality of heatmaps with scores of confidence; for each heatmap, selecting a pixel with the highest score of confidence, and associating the selected pixel to a virtual marker, thereby determining the 2D location of the virtual marker; and based on the sequences of 2D images captured by the plurality of colour video cameras, triangulating the respective determined 2D locations to predict a sequence of 3D locations of the virtual marker. Each heatmap is for 2D localization of the virtual marker of the marker-less human or animal subject or the marker-less object, and for each heatmap, the scores of confidence are indicative of probability of having the associated virtual marker in different 2D locations in the predicted 2D bounding box. The trained neural network is trained using at least the training dataset generated by a method for generating a training dataset for keypoint detection, according to an embodiment above.

According to an embodiment, a computer program adapted to perform a method for generating a training dataset for keypoint detection, and/or a method for predicting 3D locations of virtual markers on a marker-less human or animal subject or a marker-less object, according to various embodiments above, is provided.

According to an embodiment, a non-transitory computer readable medium comprising instructions which, when executed on a computer, cause the computer to perform a method for generating a training dataset for keypoint detection, and/or a method for predicting 3D locations of virtual markers on a marker-less human or animal subject or a marker-less object, according to various embodiments above, is provided.

According to an embodiment, a data processing apparatus comprising means for carrying out a method for generating a training dataset for keypoint detection, and/or a method for predicting 3D locations of virtual markers on a marker-less human or animal subject or a marker-less object, according to various embodiments above, is provided.

According to an embodiment, a system for generating a training dataset for keypoint detection is provided. The system may include an optical marker-based motion capture system configured to capture a plurality of markers over a period of time, wherein each marker is placed on a bone landmark of a human or animal subject or a keypoint of an object, and is captured as a 3D trajectory; a plurality of colour video cameras configured to capture the human or animal subject or the object over the period of time as sequences of 2D images; and a computer. The computer may be configured to: receive the sequences of 2D images captured by the plurality of colour video cameras and the respective 3D trajectories captured by the optical marker-based motion capture system; for each marker, project the 3D trajectory to each of the 2D images to determine a 2D location in each 2D image; for each marker, based on the respective 2D locations in the sequences of 2D images and an exposure-related time of the plurality of colour video cameras, interpolate a 3D position for each of the 2D images; for each 2D image, based on the respective interpolated 3D positions of the plurality of markers and an extended volume derived from two or more of the markers having an anatomical or functional relationship with one another, generate a 2D bounding box around the human or animal subject or the object; and generate the training dataset comprising at least one 2D image selected from the sequences of 2D images, the determined 2D location of each marker in the selected at least one 2D image, and the generated 2D bounding box for the selected at least one 2D image.

According to an embodiment, a system for predicting 3D locations of virtual markers on a marker-less human or animal subject or a marker-less object is provided. The system may include a plurality of colour video cameras configured to capture the marker-less human or animal subject or the marker-less object as sequences of 2D images; and a computer. The computer may be configured to: receive the sequences of 2D images captured by the plurality of colour video cameras; for each 2D image captured by each colour video camera, predict, using a trained neural network, a 2D bounding box; for each 2D image, generate, using the trained neural network, a plurality of heatmaps with scores of confidence; for each heatmap, select a pixel with the highest score of confidence, and associate the selected pixel to a virtual marker to determine the 2D location of the virtual marker; and based on the sequences of 2D images captured by the plurality of colour video cameras, triangulate the respective determined 2D locations to predict a sequence of 3D locations of the virtual marker. Each heatmap is for 2D localization of the virtual marker of the marker-less human or animal subject or the marker-less object, and for each heatmap, the scores of confidence are indicative of probability of having the associated virtual marker in different 2D locations in the predicted 2D bounding box. The trained neural network is trained using at least the training dataset generated by a system and/or method for generating a training dataset for keypoint detection, according to various embodiments above.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

As used herein, the expression "configured to" may mean "constructed to" or "arranged to".

Various embodiments may provide a data-driven marker-less multi-camera human motion capture system. In order for such system to be data-driven, it is important to use a suitable and accurate training dataset.

Figure 1A:
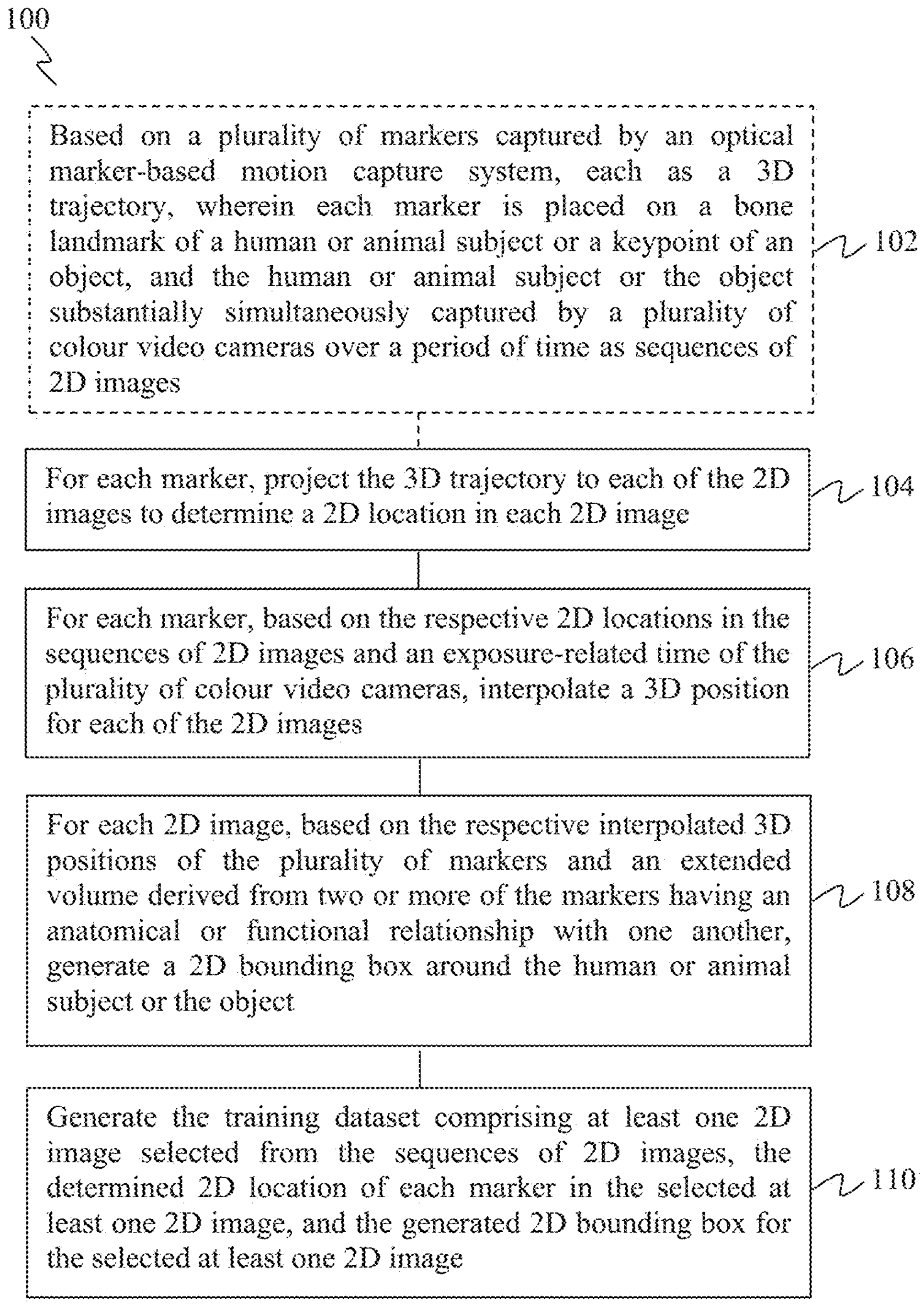
FIG. 1A shows a flow chart illustrating a method for generating a training dataset for keypoint detection, according to various embodiments.

FIG. 1A shows a flow chart illustrating a method for generating a training dataset for keypoint detection 100, according to various embodiments. At precursory Step 102, a plurality of markers is captured by an optical marker-based motion capture system, each as a 3D trajectory. Each marker may be placed on a bone landmark of a human or animal subject or a keypoint of an object. The human or animal subject or the object is substantially simultaneously captured by a plurality of colour video cameras over a period of time as sequences of 2D images. The period of time may vary depending on how much time may be needed to capture the movements of the subject. The object may be a moving object, for example, a sport equipment that may be tracked, such as a tennis racket when in use. The method 100 includes the following active steps. At Step 104, for each marker, the 3D trajectory is projected to each of the 2D images to determine a 2D location in each 2D image. At Step 106, for each marker, based on the respective 2D locations in the sequences of 2D images and an exposure-related time of the plurality of colour video cameras, a 3D position is interpolated for each of the 2D images. At Step 108, for each 2D image, based on the respective interpolated 3D positions of the plurality of markers and an extended volume derived from two or more of the markers having an anatomical or functional relationship with one another, a 2D bounding box is generated around the human or animal subject or the object. At Step 110, the training dataset is generated, wherein the training dataset includes at least one 2D image selected from the sequences of 2D images, the determined 2D location of each marker in the selected at least one 2D image, and the generated 2D bounding box for the selected at least one 2D image. For example, in the case of the human or animal subject, the two or more of the markers for deriving the extended volume may have at least one of an anatomical relation or a functional relation with one another. In another example case of the object, the two or more of the markers for deriving the extended volume may have a functional (and/or structural) relation with one another.

In other words, the method 100 focuses on learning from marker data instead of hand-annotated data. With the training data collected from a marker-based motion capture system, the accuracy and the efficiency of the data collection are significantly enhanced. In terms of position accuracy, hand annotation may often miss a joint center by a few centimeters but the marker position accuracy is in the range of a few millimeters. In terms of data generation efficiency, manual annotation, for example done in existing techniques, may take at least 20 seconds per image. On the other hand, the method 100 may generate and annotate data at the average rate of 80 images per second (including manual data clean-up time). This advantageously allows the data collection to be efficiently scale to millions of images. More accurate training data together with a larger dataset enhance the accuracy of any decent machine-learning models for this task.

In various embodiments, the plurality of markers each being captured as the 3D trajectory and the human or animal subject or the object being substantially simultaneously captured as the sequences of 2D images over the period of time at precursory Step 102 may be coordinated using a synchronized signal communicated by the optical marker-based motion capture system to the plurality of colour video cameras. In the context of various embodiments, the phase "precursory step" refers to this step being a precedent or done in advance. The precursory step may be a non-active step of the method.

The method 100 may further include, prior to the step of projecting the 3D trajectory at Step 104, identifying the captured 3D trajectory with a label representative of the bone landmark or keypoint on which the marker is placed. For each marker, the label may be arranged to be propagated with each determined 2D location such that in the generated training dataset, each determined 2D location of each marker contains the corresponding label.

The method 100 may further include, after the step for projecting the 3D trajectory to each of the 2D images to determine the 2D location in each 2D image at Step 104, in each 2D image and for each marker, drawing a 2D radius on the determined 2D location according to a distance with a predefined margin between the colour video camera (which captured that particular (each) 2D image) and the marker to form an encircled area, and applying a learning-based context-aware image inpainting technique to the encircled area to remove a marker blob from the 2D location. For example, the learning-based context-aware image inpainting technique may include a Generative Adversarial Network (GAN)-based context-aware image inpainting technique.

In various embodiments, the plurality of colour video cameras (or RGB cameras) may include a plurality of global shutter cameras. The exposure-related time may be a middle of exposure time, which is at the middle of the exposure period, to capture each 2D image using each global shutter camera. Each global shutter camera may include at least one visible light emitting diodes (LEDs) operable to facilitate a retro-reflective marker coupled to a wand to be perceived as a detectable bright spot. For example, a visible LED may include a white LED.

In the context of various embodiments, the term "wand" refers to an elongate object, to which retro-reflective marker is couplable, facilitating the waving motion of the retro-reflective marker.

The plurality of global shutter cameras may be precalibrated as follow. Based on the retro-reflective marker, with the wand being continuously waved, captured by the optical marker-based motion capture system as a 3D trajectory covering a target capture volume (or target motion capture volume), and the retro-reflective marker substantially simultaneously captured by each global shutter camera as a sequence of 2D calibration images for a period of time, for each 2D calibration image, a 2D calibration position of the retro-reflective marker may be extracted by scanning throughout the entire 2D calibration image to search for a bright pixel and identify a 2D location of the bright pixel. The period of time for capture in the precalibration may be less than two minutes, or an amount sufficient for the trajectory to cover the capture volume. An iterative algorithm may be applied at the 2D location of the searched bright pixel to make the 2D location converge at the centroid of the bright pixel cluster. Further, based on the middle of exposure time, interchangeably referred to as the middle time of the exposure period or mid-exposure timing, in each 2D calibration image and the 3D trajectory covering the target capture volume, a 3D calibration position may be linearly interpolated at the middle of exposure time from each of the 2D calibration images. A plurality of 2D-3D correspondence pairs may be formed for at least part of the plurality of 2D calibration images. Each 2D-3D correspondence pair may include the converged 2D location and the interpolated 3D calibration position for each of the at least part of the plurality of 2D calibration images. A camera calibration function may be applied on the plurality of 2D-3D correspondence pairs to determine extrinsic camera parameters and to fine-tune intrinsic camera parameters of the plurality of global shutter cameras.

Existing motion capture systems in the market practically always require the camera system to use global shutter sensors (or global shutter camera) as this reduces the complication in the calculation.

In other embodiments, the plurality of colour video cameras may be a plurality of rolling shutter cameras. Replacing global shutter cameras with rolling-shutter cameras is not a plug-and-play process as additional errors may be produced related to rolling-shutter artifacts. Making rolling-shutter cameras compatible with the kind of motion capture system used in the method 100 requires careful modeling of camera timing, synchronization, and calibration to minimize errors from the rolling-shutter effect. However, the benefit of this compatibility is the reduction of system cost as a rolling-shutter camera is significantly less expensive than a global shutter camera.

In these other embodiments, the step of projecting the 3D trajectory to each of the 2D images at Step 104 may further include: for each 2D image captured by each rolling shutter camera, determining an intersection time from a point of intersection between a first line connecting the projected 3D trajectory over the period of time and a second line representing a moving middle of exposure time to capture each pixel row of the 2D image; for each 2D image captured by each rolling shutter camera, based on the intersection time, interpolating a 3D intermediary position to obtain a 3D interpolated trajectory from the sequence of 2D images; and for each marker, projecting the 3D interpolated trajectory to each of the 2D images to determine the 2D location in each 2D image. The exposure-related time when using the plurality of rolling shutter cameras is the intersection time.

Similar to the embodiments involving global shutter cameras, each rolling shutter camera here may include at least one visible light emitting diodes operable to facilitate a retro-reflective marker coupled to a wand to be perceived as a detectable bright spot.

The plurality of rolling shutter cameras may be precalibrated as follow. Based on the retro-reflective marker, with the wand being continuously waved, captured by the optical marker-based motion capture system as a 3D trajectory covering a target capture volume, and the retro-reflective marker substantially simultaneously captured by each rolling shutter camera as a sequence of 2D calibration images for a period of time. For each 2D calibration image, a 2D calibration position of the retro-reflective marker may be extracted by scanning throughout the entire 2D calibration image to search for a bright pixel and identify a 2D location of the bright pixel. An iterative algorithm may be applied at a 2D location of the searched bright pixel to make the 2D location converge at a 2D centroid of a bright pixel cluster. Further, based on observation times of the 2D centroids from the plurality of rolling shutter cameras, a 3D calibration position may be interpolated from the 3D trajectory covering the target capture volume. The observation time of each 2D centroid of each bright pixel cluster from each 2D calibration image is calculated by $$T_i + b - e/2 + dv, \quad \text{Equation 1}$$

where $T_i$ is the trigger time of the 2D calibration image, b is the trigger-to-readout delay of the rolling shutter camera, e is the exposure time set for the rolling shutter camera, d is the line delay of the rolling shutter camera, and v is the pixel row of the 2D centroid of the bright pixel cluster.

A plurality of 2D-3D correspondence pairs may be formed for at least part of the plurality of 2D calibration images. Each 2D-3D correspondence pair may include the converged location and the interpolated 3D calibration position for each of the at least part of the plurality of 2D calibration images. A camera calibration function may be applied on the plurality of 2D-3D correspondence pairs to determine extrinsic camera parameters and to fine-tune intrinsic camera parameters of the plurality of rolling shutter cameras.

In precalibrating the plurality of colour video cameras, the iterative algorithm may be a mean-shift algorithm. The retro-reflective marker being captured by the optical marker-based motion capture system as the 3D trajectory covering the target capture volume and the retro-reflective marker being substantially simultaneously captured as the sequence of 2D calibration images may be coordinated using a synchronized signal communicated by the optical marker-based motion capture system to the plurality of colour video cameras.

Generally, the hardware layer of a motion capture system requires the cameras to use global-shutter sensors to avoid the effect of the sensing delay between the top and the bottom pixel row that is experienced by a rolling shutter camera. However, the implementation of a global shutter camera needs more complicated electronic circuits to perform simultaneous start and stop of the exposure of all the pixels. This makes a global shutter camera significantly more expensive than a rolling shutter camera at the same resolution. As human movement is not fast enough to be overly distorted by the rolling-shutter effect, it may be possible to reduce the system cost by using rolling shutter cameras with careful modeling of the rolling-shutter effect to compensate for the error. This rolling-shutter model may be integrated into the whole workflow starting from camera calibration, and data collection, as well as leading up to the triangulation of 3D keypoints, that will be discussed further below. Therefore, there advantageously provides more flexibility in the choice of cameras.

In various embodiments, the marker, referred to with respect to the method 100, includes a retro-reflective marker.

Figure 1B:
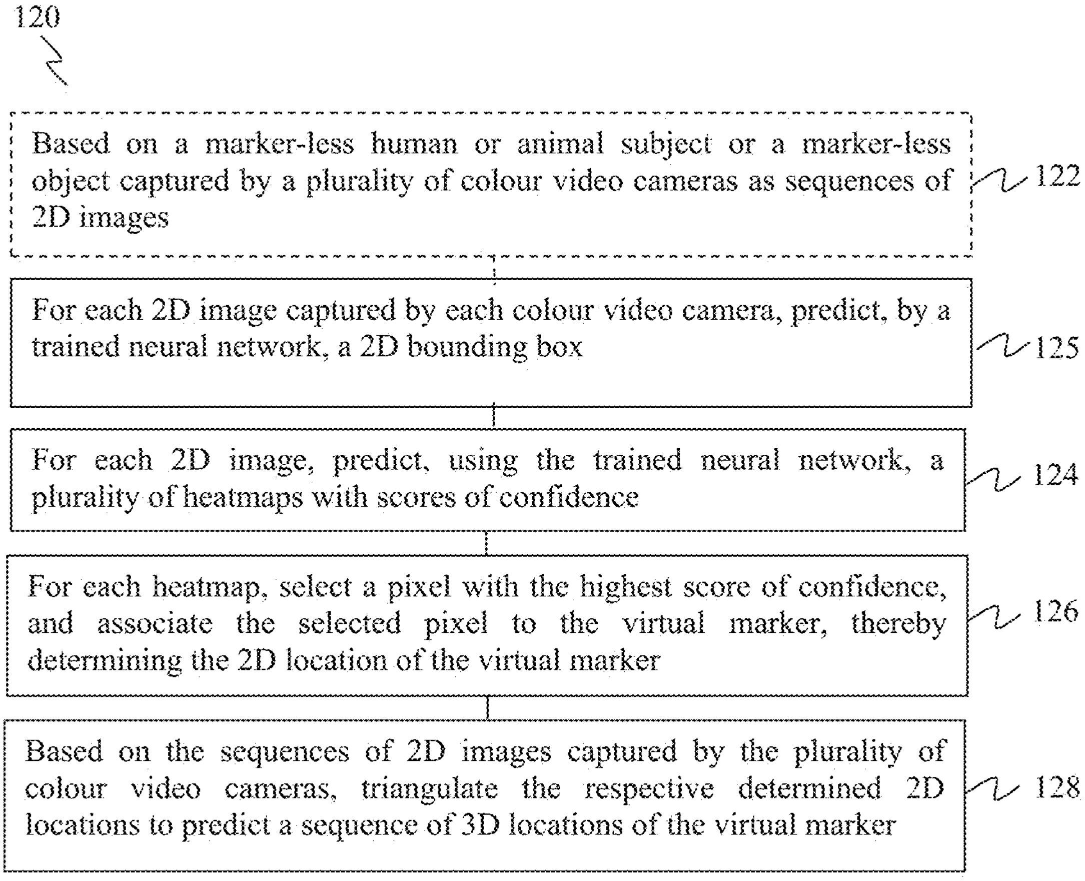
FIG. 1B shows a flow chart illustrating a method for predicting 3D locations of virtual markers on a marker-less human or animal subject or a marker-less object, according to various embodiments.

FIG. 1B shows a flow chart illustrating a method for predicting 3D locations of virtual markers on a marker-less human or animal subject or a marker-less object 120, according to various embodiments. At precursory Step 122, the marker-less human or animal subject or the marker-less object is captured by a plurality of colour video cameras as sequences of 2D images. The method 120 includes the following active steps. At Step 125, for each 2D image captured by each colour video camera, a 2D bounding box is predicted using a trained neural network. At Step 124, for each 2D image, a plurality of heatmaps with scores of confidence is generated by the trained neural network. Each heatmap is for 2D localization of a virtual marker of the marker-less human or animal subject or the marker-less object. In the context of various embodiments, 2D localization refers to a process of identifying a 2D location or 2D position of the virtual marker, and thus, each heatmap is associated to one virtual marker. The trained neural network may be trained using at least the training dataset generated by the method 100. At Step 126, for each heatmap, a pixel with the highest score of confidence is selected or chosen, and the selected pixel is associated to the virtual marker, thereby determining the 2D location of the virtual marker. For each heatmap, the scores of confidence are indicative of probability of having the associated virtual marker in different 2D locations in the predicted 2D bounding box. At Step 128, based on the sequences of 2D images captured by the plurality of colour video cameras, the respective determined 2D locations are triangulated to predict a sequence of 3D locations of the virtual marker. Optionally, the step of triangulating at Step 128 may include weighted triangulation of the respective 2D locations of the virtual marker based on the respective scores of confidence as weights for triangulation. For example, the weighted triangulation may include derivation of each predicted 3D location of the virtual marker using a formula: $(\Sigma_i w_i Q_i)^{-1}(\Sigma_i w_i Q_i c_i)$ where $$Q_i = I_3 - U_i U_i^T$$

given that i is 1, 2, . . . , N (N being the total number of colour video cameras), $w_i$ is the weight for triangulation or the confidence score of $i^{th}$ ray from $i^{th}$ colour video camera, $C_i$ is a 3D location of the $i^{th}$ colour video camera associated with the $i^{th}$ ray, $U_i$ is a 3D unit vector representing a back-projected direction associated with the $i^{th}$ ray, $I_3$ is a 3×3 identity matrix. Triangulation is a process of determining a point in 3D space given its projections onto two, or more, images. Triangulation may also be referred to as reconstruction or intersection.

In other words, the method 120 outputs virtual marker positions instead of joint center. Because generic biomechanical analysis workflows start calculation from 3D marker positions, it is important to keep the marker positions (more specifically, virtual maker positions) in the output of the method 120 to make sure that the method 120 is compatible with the existing workflows. Unlike the existing systems that learn from the manual annotation of joint centers, learning to predict marker positions produces not only the calculatable joint positions but also the orientation of body segments. These body segment orientations cannot be recovered from the set of joint centers in every pose. For example, when the shoulder, the elbow, and the wrist are approximately aligned, the singularity of this arm pose makes it impossible to recover the orientation of the upper arm and the forearm segment. However, these orientations may be calculated from shoulder, elbow, and wrist markers. Therefore, allowing the machine learning model predict marker positions (more specifically, virtual maker positions) instead of joint center positions is mandatory in more contentious applications. Direct Linear Transformation (DLT) is a well-established method to perform triangulation to obtain a 3D position from multiple 2D positions observed by two or more cameras. For this application, a new triangulation formula has been derived to improve triangulation accuracy by utilizing the score of confidence (or interchangeably referred to as confidence score), that is an additional information provided by the neural network model for each predicted 2D location. For each ray (e.g. representing a 2D location on one image), the confidence score may be included as a weight in this new triangulation formula. The method 120 may significantly improve the triangulation accuracy over the DLT method.

In various embodiments, the plurality of colour video cameras may include a plurality of global shutter cameras.

In other embodiments, the plurality of colour video cameras may be a plurality of rolling shutter cameras. In these other embodiments, the method 120 may further include prior to the step of triangulating the respective 2D locations to predict the sequence of 3D locations of the virtual marker at Step 128, determining an observation time for each rolling shutter camera based on the determined 2D locations in two consecutive 2D images. The observation time may be calculated using Equation 1, where in this case, $T_i$ refers to a trigger time of each of the two consecutive 2D images, and v is a pixel row of the 2D location in each of the two consecutive 2D images. Based on the observation time, a 2D location of the virtual marker is interpolated at the trigger time. The step of triangulating the respective 2D locations at Step 128 may include triangulating the respective interpolated 2D locations derived from the plurality of rolling shutter cameras.

In one embodiment, the plurality of colour video cameras may be extrinsically calibrated as follow. Based on one or more checkerboards simultaneously captured by the plurality of colour video cameras, for every two of the plurality of colour video cameras, calculating a relative transformation between the two colour video cameras. When the plurality of colour video cameras have the respective calculated relative transformations, that being once all the existing cameras are linked by relative transformation, applying an optimization algorithm to fine-tune extrinsic camera parameters of the plurality of colour video cameras. More specifically, the optimization algorithm is the Levenberg-Marquardt algorithm and its cv2 function that is being applied to the 2D checkerboard observations and initial relative transformations. The one or more checkboards may include unique markings.

In another embodiment, the plurality of colour video cameras may alternatively be extrinsically calibrated as follow. Each colour video camera may include at least one visible light emitting diodes (LEDs) operable to facilitate multiple retro-reflective markers coupled to a wand to be perceived as detectable bright spots. Based on the retro-reflective markers, with the wand being continuously waved, captured by the plurality of colour video cameras as sequences of 2D calibration images, applying an optimization function to the captured 2D calibration images to fine-tune extrinsic camera parameters of the plurality of colour video cameras. The optimization algorithm may be the Levenberg-Marquardt algorithm and its cv2 function, as discussed above.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Various embodiments may also provide a computer program adapted to perform a method 100 and/or a method 120, according to various embodiments.

Various embodiments may further provide a non-transitory computer readable medium comprising instructions which, when executed on a computer, cause the computer to perform a method 100 and/or a method 120, according to various embodiments.

Various embodiments may yet further provide a data processing apparatus comprising means for carrying out a method 100 and/or a method 120, according to various embodiments.

Figure 1C:
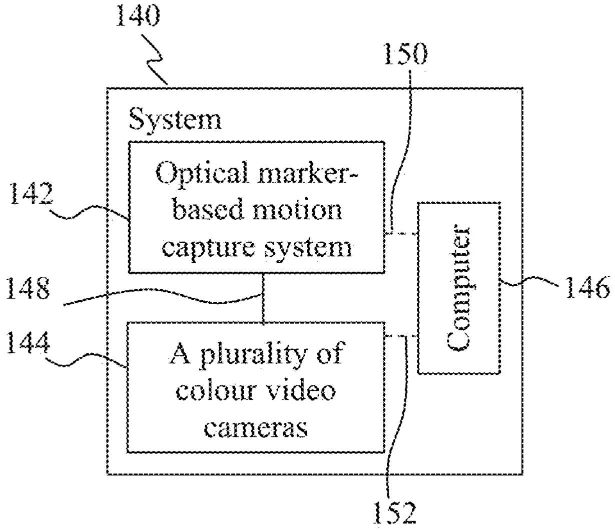
FIG. 1C shows a schematic view of a system for generating a training dataset for keypoint detection, according to various embodiments.

FIG. 1C shows a schematic view of a system for generating a training dataset for keypoint detection 140, according to various embodiments. The system 140 may include an optical marker-based motion capture system 142 configured to capture a plurality of markers over a period of time; and a plurality of colour video cameras 144 configured to capture a human or animal subject or an object over the period of time as sequences of 2D images. Each marker may be placed on a bone landmark of the human or animal subject or a keypoint of the object and may be captured as a 3D trajectory. The system 140 may also include a computer 146 configured to receive the sequences of 2D images captured by the plurality of colour video cameras 144 and the respective 3D trajectories captured by the optical marker-based motion capture system 142, as denoted by dotted lines 152, 150. The period of time may vary depending on how much time may be needed to capture the movements of the subject or object. The computer 146 may be further configured to: for each marker, project the 3D trajectory to each of the 2D images to determine a 2D location in each 2D image; for each marker, based on the respective 2D locations in the sequences of 2D images and an exposure-related time of the plurality of colour video cameras 144, interpolate a 3D position for each of the 2D images; for each 2D image, based on the respective interpolated 3D positions of the plurality of markers and an extended volume derived from two or more of the markers having an anatomical or functional relationship with one another, generate a 2D bounding box around the human or animal subject or the object; and generate the training dataset including at least one 2D image selected from the sequences of 2D images, the determined 2D location of each marker in the selected at least one 2D image, and the generated 2D bounding box for the selected at least one 2D image. In an embodiment, the computer 146 may be the same computer that is in communication with the plurality of colour video cameras 144 and the optical marker-based motion capture system 142 to record the respective data. In a different embodiment, the computer 146 may be a separate processing computer from a computer that is in communication with the plurality of colour video cameras 144 and the optical marker-based motion capture system 142 to record the respective data.

The system 140 may further include a synchronization pulse generator in communication with the optical marker-based motion capture system 142 and the plurality of colour video cameras 144, wherein the synchronization pulse generator may be configured to receive a synchronization signal from the optical marker-based motion capture system 142 for coordinating the human or animal subject or the object to be substantially simultaneously captured by the plurality of colour video cameras 144, as denoted by line 148. For example, the plurality of colour video cameras 144 may include at least two colour video cameras, preferably eight colour video cameras.

In various embodiments, the optical motion capture system 142 may include a plurality of infrared cameras. For example, there may be at least two infrared cameras arranged spaced apart from each other to capture the subject from different views.

The plurality of colour video cameras 144 and the plurality of infrared cameras are arranged spaced apart from one another and at least alongside a path taken by the human or animal subject or the object, or at least substantially surrounding a capture volume of the human or animal subject or the object.

The 3D trajectory may be identifiable with a label representative of the bone landmark or keypoint on which the marker is placed. For each marker, the label may be arranged to be propagated with each determined 2D location such that in the generated training dataset, each determined 2D location of each marker contains the corresponding label.

In some examples, the computer 146 may further be configured to, in each 2D image, draw a 2D radius on the determined 2D location for each marker according to a distance with a predefined margin between the colour video camera 144 (which captured that particular (each) 2D image) and the marker to form an encircled area, and to apply a learning-based context-aware image inpainting technique to the encircled area to remove a marker blob from the 2D location. For example, the learning-based context-aware image inpainting technique may include a Generative Adversarial Network (GAN)-based context-aware image inpainting technique.

In various embodiments, the plurality of colour video cameras 144 may be a plurality of global shutter cameras.

In other embodiments, the plurality of colour video cameras 144 may be a plurality of rolling shutter cameras. In these other embodiments, the computer 146 may further be configured to: for each 2D image captured by each rolling shutter camera, determine an intersection time from a point of intersection between a first line connecting the projected 3D trajectory over the period of time and a second line representing a moving middle of exposure time to capture each pixel row of the 2D image; for each 2D image captured by each rolling shutter camera, based on the intersection time, interpolate a 3D intermediary position to obtain a 3D interpolated trajectory from the sequence of 2D images; and for each marker, project the 3D interpolated trajectory to each of the 2D images to determine the 2D location in each 2D image.

The system 140 may be used to facilitate the performance of the method 100. Thus, the system 140 may include the same or like elements or components as those of the method 100 of FIG. 1A, and as such, the like elements may be as described in the context of the method 100 of FIG. 1A, and therefore the corresponding descriptions may be omitted here.

Figure 2:
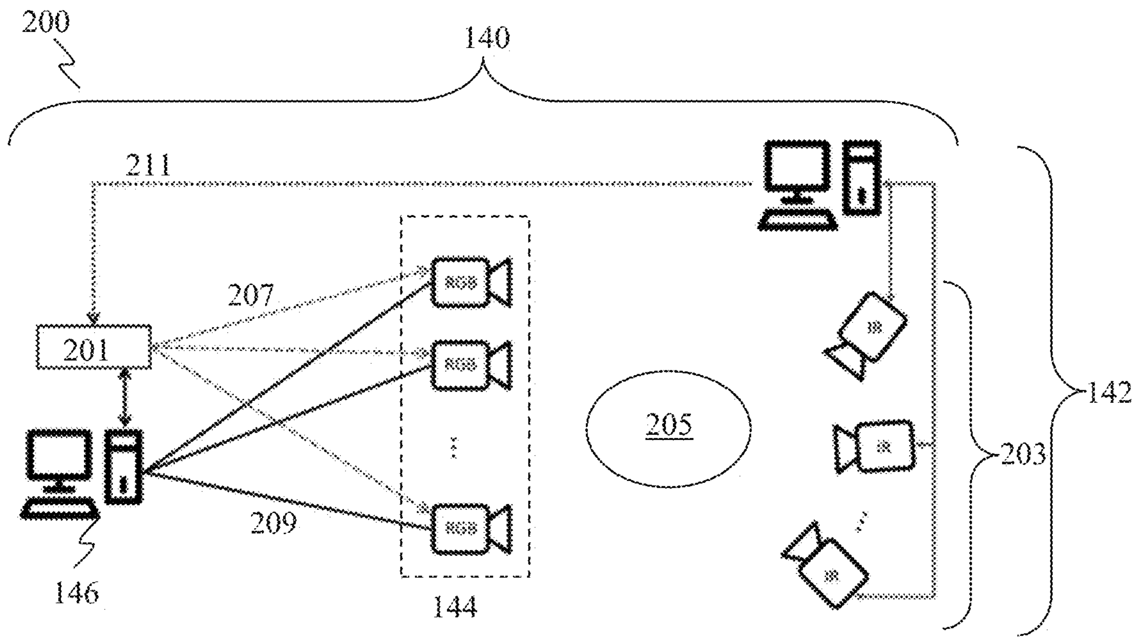
FIG. 2 shows an exemplary setup of the system of FIG. 1C.

An exemplary setup 200 of the system 140 is shown schematically in FIG. 2. As seen in FIG. 2, the plurality of colour (RGB) video cameras 144 and the infrared (IR) cameras 203 are arranged around a subject 205 with retro-reflective markers placed on bone landmarks or keypoints. Different arrangements (not shown in FIG. 2) may also be possible. When the subject 205 moves, the retro-reflective markers also moves in capture volume. The synchronization pulse generator 201 may be in communication with the optical motion capture system 142 with the synchronization signal 211, the colour video cameras 144 via synchronization channels 207, and the computer 146. The computer 146 and the colour video cameras 144 may be in communication using data channels 209.

Figure 1D:
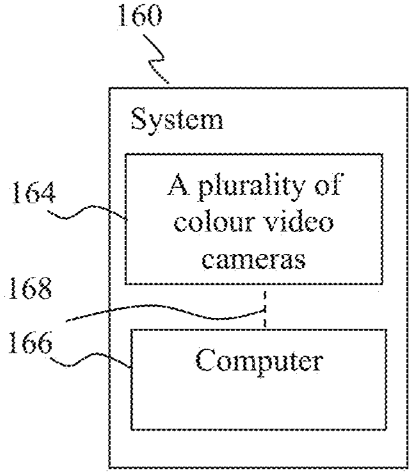
FIG. 1D shows a schematic view of a system for predicting 3D locations of virtual markers on a marker-less human or animal subject or a marker-less object, according to various embodiments.

FIG. 1D shows a schematic view of a system for predicting 3D locations of virtual markers on a marker-less human or animal subject or a marker-less object 160, according to various embodiments. The system 160 may include a plurality of colour video cameras 164 configured to capture the marker-less human or animal subject or the marker-less object as sequences of 2D images; and a computer 166 configured to receive the sequences of 2D images captured by the plurality of colour video cameras 164, as denoted by dotted line 168. The computer 166 may be further configured to: for each 2D image captured by each colour video camera 164, predict, using a trained neural network, a 2D bounding box; for each 2D image, generate, using the trained neural network, a plurality of heatmaps with scores of confidence; for each heatmap, select a pixel with the highest score of confidence, and associate the selected pixel to a virtual marker to determine the 2D location of the virtual marker; and based on the sequences of 2D images captured by the plurality of colour video cameras 164, triangulate the respective determined 2D locations to predict a sequence of 3D locations of the virtual marker. Each heatmap may be for 2D localization of the virtual marker of the marker-less human or animal subject or the marker-less object. For each heatmap, the scores of confidence are indicative of probability of having the associated virtual marker in different 2D locations in the predicted 2D bounding box. The trained neural network may be trained using at least the training dataset generated by the method 100. In an embodiment, the computer 166 may be the same computer that is in communication with the plurality of colour video cameras 164 to record the data. In a different embodiment, the computer 166 may be a separate processing computer from a computer that is in communication with the plurality of colour video cameras 164 to record the data.

Optionally, the respective 2D locations of the virtual marker may be triangulated based on the respective scores of confidence as weights for triangulation. For example, the triangulation may include derivation of each predicted 3D location of the virtual marker using a formula: $(\Sigma_i w_i Q_i)^{-1}(\Sigma_i w_i Q_i C_i)$ where $$Q_i = I_3 - U_i U_i^T$$

given that i is 1, 2, . . . , N (N being the total number of colour video cameras), $w_i$ is the weight for triangulation or the confidence score of $i^{th}$ ray from $i^{th}$ colour video camera, $C_i$ is a 3D location of the ii colour video camera associated with the $i^{th}$ ray, $U_i$ is a 3D unit vector representing a back-projected direction associated with the $i^{th}$ ray, $I_3$ is a 3×3 identity matrix.

In various embodiments, the plurality of colour video cameras 164 may be a plurality of global shutter cameras.

In other embodiments, the plurality of colour video cameras 164 may be a plurality of rolling shutter cameras. In these other embodiments, the computer 166 may further be configured to: determine an observation time for each rolling shutter camera based on the determined 2D locations in two consecutive 2D images, and based on the observation time, interpolate a 2D location of the virtual marker at the trigger time. The observation time may be calculated using Equation 1, where $T_i$ is the trigger time of each of the two consecutive 2D images, and v is a pixel row of the 2D location in each of the two consecutive 2D images. The respective interpolated 2D locations derived from the plurality of rolling shutter cameras may be triangulated to predict a sequence of 3D locations of the virtual marker.

Figure 3:
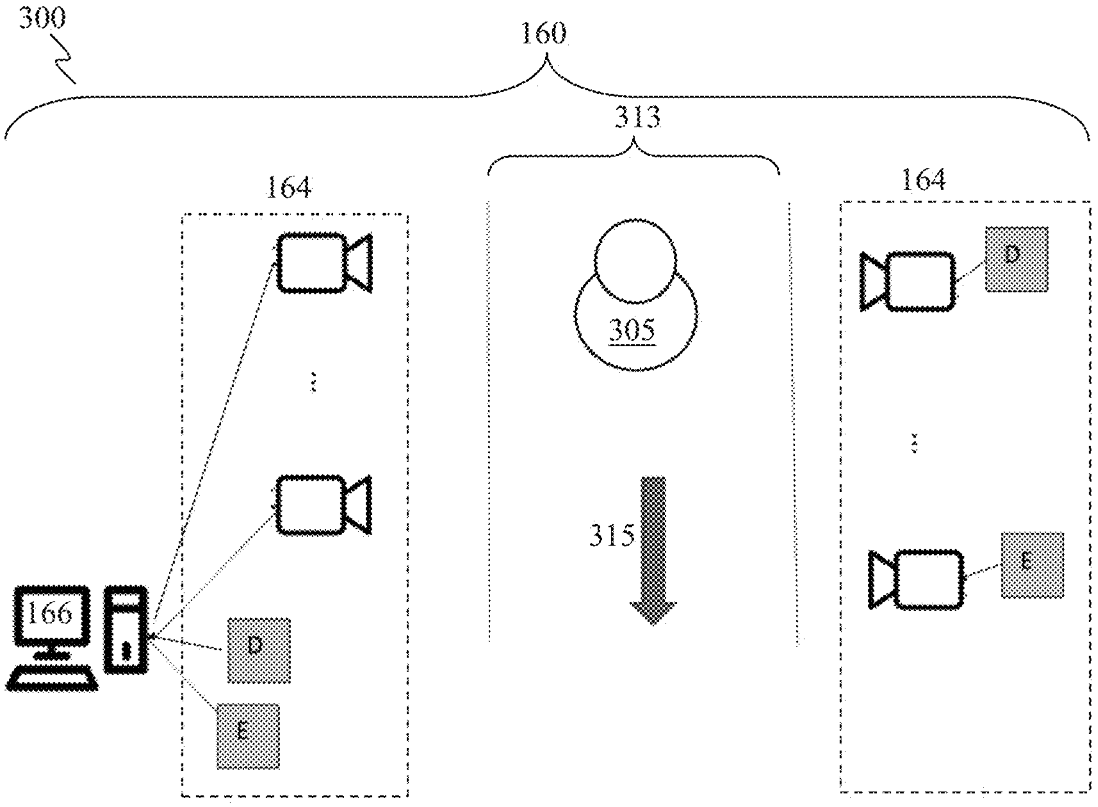
FIG. 3 shows an exemplary setup of the system of FIG. 1D.

As seen from an exemplary setup 300 of the system 160 schematically illustrated in FIG. 3, the plurality of colour video cameras 164 may be arranged spaced apart from one another and operable along at least part of a walkway or capture volume 313 (that may be part of a corridor in a clinic/hospital) to a medical practioner's room such that when the marker-less human or animal subject (e.g. patient 305) walks along the walkway or capture volume 313, as denoted by arrow 315 and into the medical practioner's room, the sequences of 2D images captured by the plurality of colour video cameras 164 may be processed by the system 160 to predict the 3D locations of the virtual markers on the marker-less human or animal subject. In other words, after the patient 305 walks into the medical practioner's room via the walkway or capture volume 313 to see the medical practioner, the system 160 would have predicted the 3D locations of the virtual markers on the patient 305 and these 3D locations may be used to facilitate information such as an animation (in digitalized form) illustrating the movements of the patient 305. The computer 166 may be located in the medical practioner's room or elsewhere proximally to the plurality of colour video cameras 164. For the latter, the predicted/processed information may be remotely transmitted to a computing or display device located in the medical practioner's room, or to a mobile device for processing/display. Points D, E merely represent electrical coupling of some colour video cameras 164 (seen on the right side of FIG. 3) to the computer 166 (see on the left side of FIG. 3). Other arrangements of the colour video cameras 164 may be possible. For example, the plurality of colour video cameras 164 may be arranged all along one side of the walkway 313.

The system 160 may be used to facilitate the performance of the method 120. Thus, the system 160 may include the same or like elements or components as those of the method 120 of FIG. 1B, and as such, the like elements may be as described in the context of the method 120 of FIG. 1B, and therefore the corresponding descriptions may be omitted here. The system 160 may also include some of the same or like elements or components as those of the system 140 of FIG. 1C, and as such, the same ending numerals are assigned and the like elements may be as described in the context of the system 140 of FIG. 1C, and therefore the corresponding descriptions may be omitted here. For example, in the context of various embodiments, the plurality of colour video cameras 164 are the same as the plurality of colour video cameras 144 of FIG. 1C.

Examples of the methods 100, 120 and the systems 140, 160 will be described in more detail below.

i. ADVANTAGES AND IMPROVEMENTS

Several advantages and improvements of the methods 100, 120 and the systems 140, 160, according to various embodiments, are appreciated over existing methods/systems.

Advantages Against Non-Optical Motion Capture Systems

Non-optical motion capture systems may be in various forms. One of the most popular kind in the market uses inertial measurement unit (IMU) suits to measure the acceleration, angular velocity, and ambient magnetic field to approximate the orientation, position, and the trajectory of the sensors. Ultra-wideband technology may also be integrated for better localization. Another existing tracking technology may be using an electromagnetic transmitter to track sensors within a spherical capture volume with a small radius of 66 cm. One common disadvantage among such systems is the obtrusiveness of the sensors on a subject's body. Attaching sensors on the subject not only takes time in the subject preparation but may also cause unnatural movements and/or hinder movements. With the markerless motion capture system described in the present application (e.g. system 160), no additional items are required on the subject body and this makes the motion capture workflow smoother with fewer human involvement/intervention in the process.

Advantages Against Commercial Marker-Based System

A careful marker placement for a full-body motion capture by a skillful person normally takes at least 30 minutes. If the marker is removed from the workflow, one human (skillful person) may be removed from the workflow and at least 30 minutes may be saved for every new subject. After the record, the existing marker-based motion capture system only provides trajectories of unlabeled markers, which are not usable for any analysis until the data are post-processed with marker labeling and gap filling. This process is usually done in a semi-automated way which takes about 1 man-hour to process just 1 minute of record time. With the markerless motion capture system (e.g. system 160), manual post-processing steps are not applicable anymore because the system 160 inherently outputs virtual marker positions with labels. As all the virtual marker processing is fully automated, the 1 man-hour per minute of record may be saved and replaced by about 20 machine-minutes per minute of record time or even faster with more computing power. From the cost perspective, commercial marker-based systems range between SGD 100,000 to 500,000, however, all the materials in the markerless system 160 may cost just about SGD 10,000 which is about 10% of a low-end marker-based system. One technical advantage that the data-driven markerless system (e.g. system 160) has over a marker-based system is the way the markless system avoids occlusions. To the best of the inventors' knowledge, the only way to avoid occlusion in a marker-based system is to add more cameras to make sure that at least 2 cameras always see one marker simultaneously. However, the markerless system (e.g. system 160) may infer virtual markers in the occluded region, therefore, it does not require as many cameras and it produces much lesser gaps in the marker trajectory. Moreover, the use of markers may cause unnatural movements, marker drops during the record, or sometimes skin irritation. Removing use of markers just simply removes at least these problems mentioned above.

Advantages Against a Single Depth-Camera System

The depth camera is the camera that gives a depth value in each pixel instead of the color value. Therefore, only one camera sees the 3D surface of the subject from one side. This information may be used to estimate the human pose for the motion capture purpose. However, the resolution of off-the-shelf depth cameras is relatively low compared to color cameras and the depth values are usually noisy. This makes the motion capture result from a single depth camera relatively not accurate with extra problems from occlusion. For example, the wrist position error from Kinect SDK and Kinect 2.0 normally ranges from 3-7 cm even without occlusion. The markerless system (e.g. system 160) produces more accurate results at below 2 cm of average error.

Advantages Against Freely Available Open-Source Human Tracking Software

There are many open-source projects that share 2D human keypoint detection software for free such as MediaPipe from Google, OpenVINO from Intel, and Detectron2 from Facebook, amongst others. These projects also work in data-driven ways but they rely on human-annotated datasets as training data. To demonstrate the advantage of using the marker-based annotation, M-BA (e.g. as used in the method 100 and/or the system 140) over the manual annotation, a set of preliminary results have been produced for comparison in Table I below as well as in FIG. 4.

Advantages Against Commercial Markerless Motion Capture System

One existing commercial markerless motion capture system that was compared with is Theia Markerless. Theia Markerless is a software system that strictly supports videos from only two camera systems: Qualisys Miqus Video, and Sony RX0M2. The hardware layer for these two camera systems already costs about SGD 63,000 or SGD 28,000 respectively (for 8 cameras plus a computer) with an additional SGD 28,000 for the software cost. In contrast, the material cost in the whole hardware layer for the system 160 only costs about SGD 10,000. To evaluate the accuracy, a similar test was performed on Theia Markerless as well. It is noted that the videos used for Theia Markerless evaluation are recorded by the expensive Miqus Video global shutter camera system (all the 8 cameras being located side-by-side with the plurality of colour video cameras 164). All the tracking and the triangulation algorithm are done in the software executable and are not revealed. Notwithstanding the more expensive hardware used for Theia Markerless, the system 160 performs superiorly in every joint in the evaluation (see Table I and FIG. 4). One downside of Theia Markerless is data gaps from the joint extraction. When the software is not certain about a particular joint in a particular frame, it decides not to give the answer from that joint. This relatively high percentage of gaps (0.6-2.4%) may easily cause more issues in the subsequent analysis. On the other hand, the system 160, according to various embodiments, always predicts the result.

TABLE 1

Comparison of average 3D joint prediction error among available projects

| | Google's MediaPipe | | Intel's OpenVINO | | Facebook's Detectron2 | | Theia Markerless | | M-BA | |
|---|---|---|---|---|---|---|---|---|---|---|
| Joint | Error (mm) | Gap | Error (mm) | Gap | Error (mm) | Gap | Error (mm) | Gap | Error (mm) | Gap |
| Shoulder | 29.86 | 0.0% | 30.00 | 0.0% | 23.97 | 0.0% | 21.95 | 0.6% | 19.11 | 0.0% |
| Elbow | 36.93 | 0.0% | 32.04 | 0.0% | 23.11 | 0.0% | 20.09 | 2.3% | 15.62 | 0.0% |
| Wrist | 32.15 | 0.0% | 36.42 | 0.0% | 20.76 | 0.0% | 17.65 | 2.4% | 15.81 | 0.0% |
| Hip | 36.83 | 0.0% | 39.14 | 0.0% | 33.64 | 0.0% | 25.33 | 0.2% | 22.86 | 0.0% |
| Knee | 37.01 | 0.0% | 22.27 | 0.0% | 17.61 | 0.0% | 18.27 | 1.0% | 16.34 | 0.0% |
| Ankle | 20.58 | 0.0% | 26.04 | 0.0% | 17.53 | 0.0% | 13.92 | 0.9% | 8.39 | 0.0% |
| All | 32.19 | 0.0% | 30.95 | 0.0% | 22.65 | 0.0% | 19.44 | 1.3% | 16.23 | 0.0% |

Figure 4:
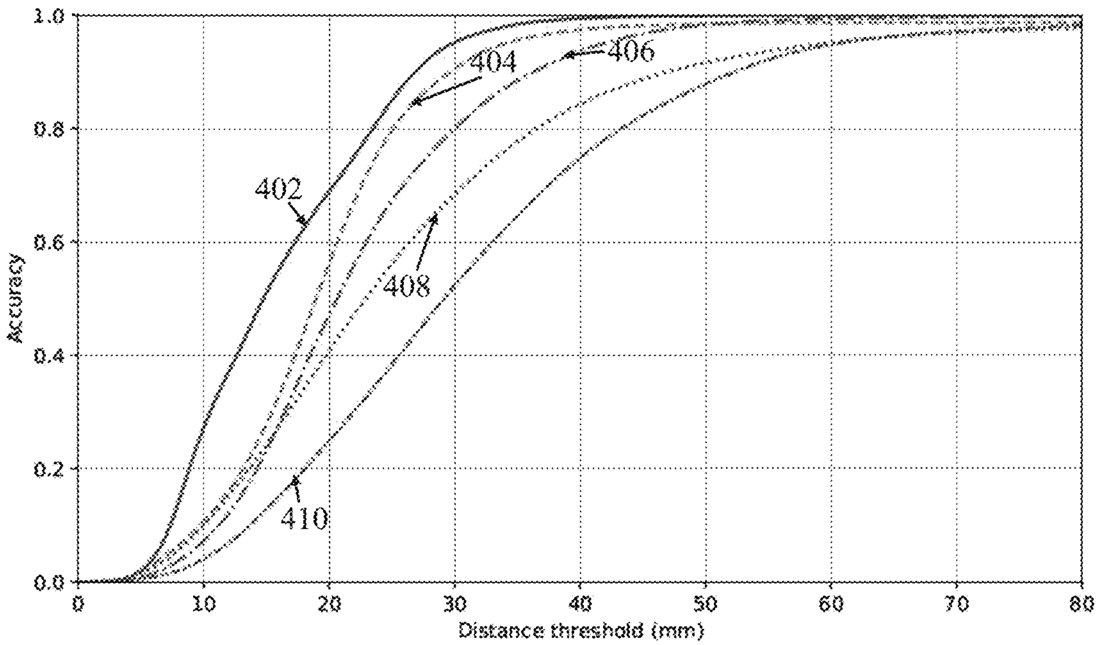
FIG. 4 shows a plot illustrating overall accuracy profiles from twelve joints from different tools, according to various examples.

FIG. 4 shows a plot illustrating overall accuracy profiles from twelve joints (e.g. shoulder, elbow, wrist, hip, knee, and ankle) from different tools namely M-BA 402, Theia Markerless 404, Facebook's Detectron2 406, OpenVINO 408 and MediaPipe 410. As noted in FIG. 4, M-BA 402, that serves as basis for the methods 100, 120, produces the highest accuracy throughout the entire distance threshold.

To get the results in Table 1 and FIG. 4, a 8-camera system (described in similar context to the system for predicting 3D locations of virtual markers on a marker-less human or animal subject 160, and the plurality of colour video cameras 164) to take more than 50,000 frames (each frame containing 8 viewpoints) from one male test subject and one female test subject performing a list of random actions. At the same time, a maker-based motion capture system (Qualisys) (described in similar context to the optical marker-based motion capture system 142) is used to record the ground-truth position for accuracy comparison. For the system (e.g. 160), the data preparation, training, inference, and triangulation method are described in ii. Technical Description Section below. The training data used in this experiment contains about 2.16 million images from twenty-seven subjects, where the two test subjects are not included in the training data. For MediaPipe, OpenVINO, and Detectron2, the 2D joint positions output from these tools are triangulated and compared to the gold-standard measurement from a marker-based motion capture system in the same ways as what carried out for the system (e.g. 160). In the case of MediaPipe, because it does not work well when the subject size is small relatively to the image size, the image is cropped with the ground-truth subject bounding box before the inference of 2D joint positions. The experimental result shows that the method (e.g. 120) produces lower average errors than those open-source tools in all six joints. It is important to know that Detectron2 and the method (e.g. 120) use exactly the same neural network architecture. This means that the focus here is on engineering better training data that directly reduces the average error by about 28%.

ii. TECHNICAL DESCRIPTION

This section describes important components, techniques, and ideas that cause the system (described in similar context to the systems 140, 160) to work. Since the ablation study has not been done, it is still unclear how much each idea contributes to the final accuracy. However, the reasons for every part of the design are given.

Sensing Hardware & Camera Configuration

To collect training data (described in similar context to the method for generating a training dataset for keypoint detection 100), one marker-based motion capture system (e.g. 142) and multiple color video cameras (e.g. 144) are needed. The motion capture system 142 is able to produce synchronization signals, and the video cameras 144 are able to take a shot when a synchronization pulse is received. Hardware clock multiplier and divider may be used to allow synchronization at two different frame rates because a normal video camera normally runs at a much lower frame rate than a motion capture system.

All the video cameras are set about 170 cm above the ground and face towards a central capture area. It is important to have training images taken from substantially same heights to minimize the variation of the data that is controllable during the training and system deployment. In addition, 170 cm may be the height that a generic tripod reaches without having to build a framework to mount cameras.

Figure 5:
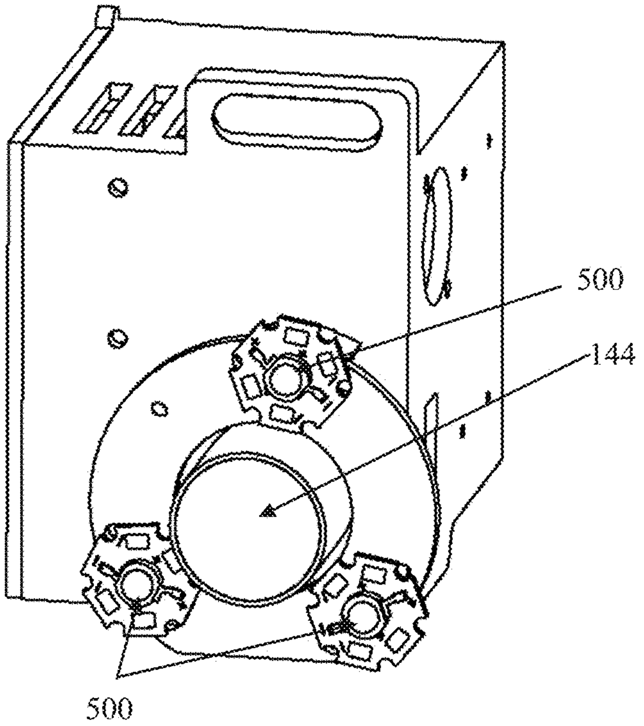
FIG. 5 shows a schematic perspective view of a camera prototype with three visible LEDs to be used only in a calibration process, according to one embodiment.

To support precise calibration or precalibration, each video camera (e.g. 144) is equipped with at least one visible (white) LEDs 500 similar to the example shown in FIG. 5 where three such LEDs may be provided. These LEDs 500 allow a normal video camera that only perceives light in the visible spectrum to see a round retro-reflective marker as a detectable bright spot on the taken (captured) image. When the marker-based motion capture system 142 sees this marker in 3D space and the video camera 144 simultaneously sees this marker as well in 2D on the image, they form a 2D-3D correspondence pair. Enough collection of these correspondence pairs throughout the capture volume may be used to calculate an accurate camera pose (extrinsic parameters) and to fine-tune intrinsic camera parameters. One important camera setting is the exposure time. The exposure needs to be sufficiently short to minimize the motion blur. During the video record, the target subject is human. Therefore, the exposure time is chosen to be $2^{-8}$ seconds or about 3.9 ms. At this timing, the edge of the human silhouette during a very fast movement is still sharp. During the calibration, the target object is a retro-reflective marker that may move faster than a human body. Therefore, the exposure time is chosen to be $2^{-10}$ seconds or about 1 ms. At this exposure, the capture environment is significantly dark but the reflection from the marker is still bright enough to be detected. The video camera 144 may use both a global shutter sensor or a rolling-shutter sensor. As the global shutter kind is generally used for this kind of application, the following explanation focuses more on the integration of rolling-shutter cameras in this application as it requires additional modeling and calculations.

Rolling-Shutter Camera Model

Figure 6:
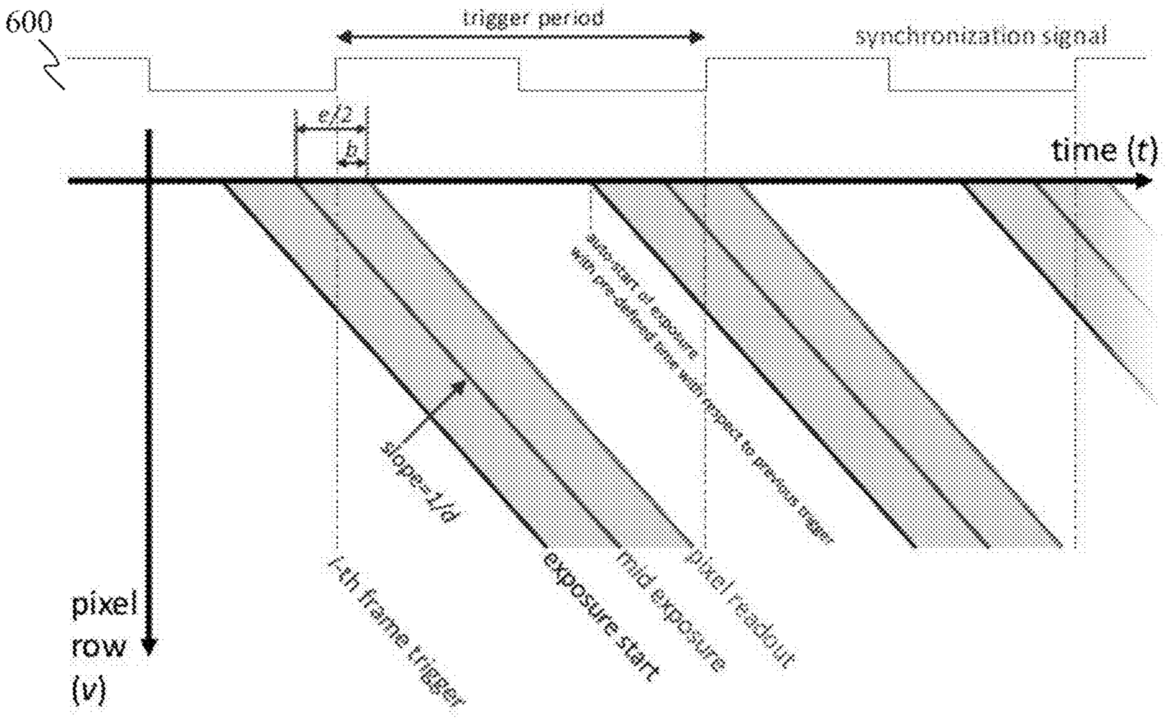
FIG. 6 shows a graphical representation of a rolling shutter model, according to one embodiment.

This section describes a rolling-shutter model developed for FSCAM_CU135 camera from e-con System. However, this model may be applicable to most rolling-shutter cameras as they operate in a similar way. In FSCAM's hardware trigger mode, rising-edge pulses are used to trigger image capture. Upon receiving a trigger pulse, the camera sensor experiences a delay of b second before starting the readout. It then reads pixels row-by-row starting from the top, with a line delay of d second per row until the last row is reached. The exposure for the next frame is automatically started based on a predetermined timing with respect to the previous trigger. The readout for the next image starts in the same manner from the next rising-edge pulse. The trigger-to-readout delay (b) and the line delay (d) are dependent on the camera model and configuration. In the case of FSCAM running at 1920×1440 resolution, b and d are about $5.76\times10^{-4}$ second and $1.07\times10^{-5}$ second, respectively. This rolling-shutter model 600 developed for FSCAM_CU135 cameras is illustrated in FIG. 6. In this model 600, it is assumed that all pixels in the same row always operate simultaneously. According to FIG. 6, the center line of the exposure zone (mid-exposure line) represents the linear relationship between the pixel row and the time. This means that if an object is observed at a specific pixel row of a specific video frame, the exact time (t) of capturing for that object can be calculated. This relationship can be formulated similarly as Equation 1:

$$T_i+b-e/2+dv, \qquad \text{Equation 1}$$

where $T_i$ is a trigger time of the video frame (i), e is an exposure time, and v is the pixel row.

As seen in FIG. 6, the gray area is the time when a pixel row is exposed to light. Note that the first row of the image starts from the top row. This model 600 is used in the following ways.

Figure 7:
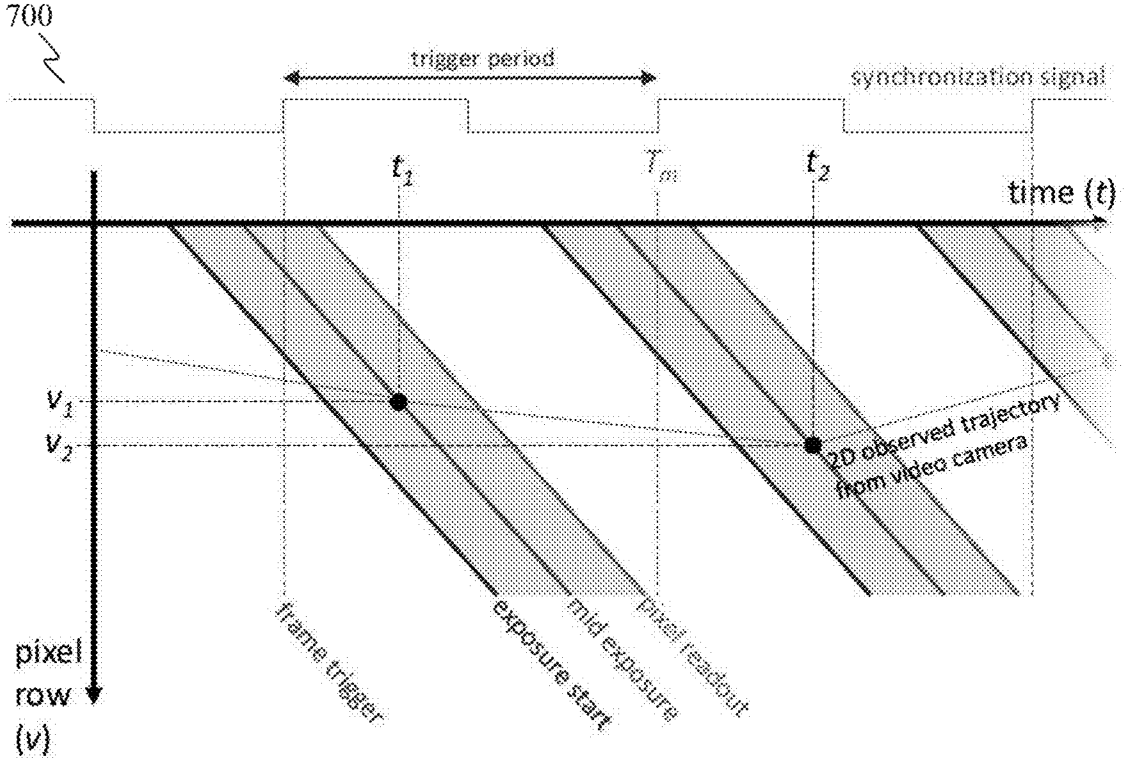
FIG. 7 shows a graphical representation of the rolling shutter model of FIG. 6, illustrating interpolation of a 2D marker trajectory at a trigger time.

Interpolation of a 2D marker trajectory at the trigger time: When multiple rolling-shutter cameras observe the same object (such as a marker), the time of those observations is usually mismatched as the object does not project to the same pixel row across all the cameras. This time mismatching causes large errors when the process needs observation from multiple cameras. For example, triangulation of 2D observations from multiple cameras assumes that those observations are from the same moment, otherwise, it could give a large error especially when the object is moving fast. To enhance the process during the result triangulation, the rolling-shutter model may be used to approximate the 2D position of the observed marker or object at the trigger time so that observations that happen exactly at the same timing across all the cameras may be obtained. The calculation from the rolling-shutter model 600 is illustrated in a graphical representation 700 of FIG. 7. In FIG. 7, each black dot represents an observation point on one video frame. These dots always stay on the mid exposure line according to the rolling-shutter model 600. For each observation in one specific frame, a known pixel row (v) may be used to solve for the time of observation (t) from Equation 1. When the time of observation is known in the two consecutive video frames ($t_1$ and $t_2$), a linear interpolation of 2D position at the time of trigger in between may be done easily. In other words, to approximate the position of an observed 2D trajectory at the trigger time ($T_m$), the time of observation ($t_1$ and $t_2$) is calculated from the row of observation ($v_1$ and $v_2$) first. With $t_1$ and $t_2$ interpolation of 2D position at $T_m$ may be done The interpolated value is used in triangulation as if it is from a global shutter camera.

Figure 8:
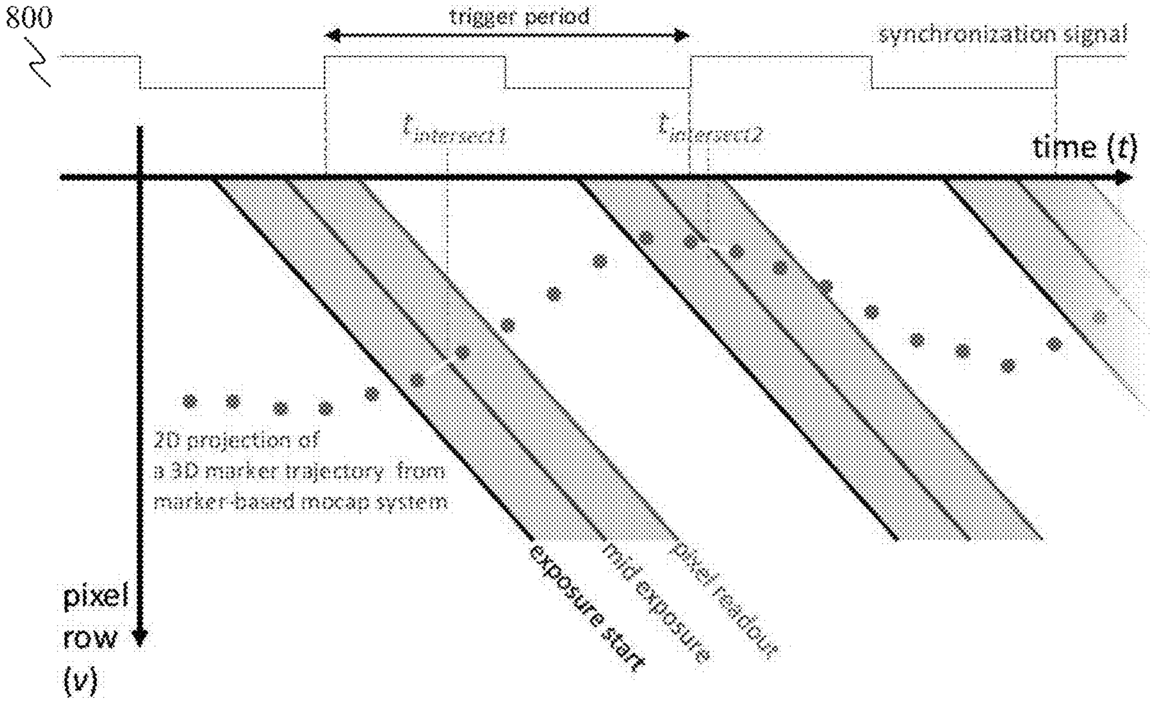
FIG. 8 shows a graphical representation of a 3D marker trajectory from a marker-based motion capture system projected to a camera, according to one embodiment.

Projection of 3D marker trajectory to the 2D image: In the training data generation, one crucial step is to produce 2D locations of 40 body markers on every video frame. If the camera uses a global shutter sensor, the time of observation is known exactly for the entire image. That time may be used to interpolate a 3D position from the marker trajectory and project it to video cameras directly. In contrast, the time of observation from rolling-shutter depends on the result (row) of projection which is not known until the projection is done. Therefore, a new projection method 800 illustrated in FIG. 8 is developed.

First, the target 3D trajectory from the marker-based mocap system (e.g. the optical motion capture system 142) is projected directly to the target camera (e.g. each of the plurality of colour video cameras 144) sample-by-sample. In other words, when the 3D marker trajectory from the marker-based mocap system is projected to the camera, it may be plotted as shown in FIG. 8 where each point represents one sample. For each sample, the projection gives the pixel row (v), and the time of that sample is also known. With a relatively higher sample frequency of marker-based mocap system, if the dots of projection are connected in the plot like FIG. 8, there are some lines or adjacent pairs that intersect with the mid exposure line (from Equation 1). As any two consecutive samples may form a linear equation (line that connects two dots), if this equation intersects with any mid-exposure line from Equation 1 in its own time section, the solution of these two linear equations tell the exact time of the interpolation. This intersection time is used to interpolate a 3D position from the trajectory. Then, the interpolated 3D position may be projected to the camera (or image) to obtain a precise projection that agrees with the observation and may be used in the training.

Video Camera Calibration

Initialization of Camera Intrinsic Parameters: For each video camera, a standard process with OpenCV library is used to approximate camera intrinsic parameters. A 10-by-7 checkerboard with 35-mm blocks is held still at 30 different poses in front of the camera to take 30 different images. Then, cv2.findChessboardCorners is used to find 2D checkerboard corners on each image. Then, cv2.calibrateCamera is used to get an approximation of the intrinsic matrix and distortion coefficients. These values are fine-tuned in the next stage of the calibration.

Camera Calibration for Training Data Collection: This calibration, more specifically, precalibration process assumes that the marker-based mocap system (e.g. the optical motion capture system 142) is already calibrated because the extrinsic parameter solution from the following calibration is in the marker-based mocap reference frame. This calibration is done by waving a wand with one retro-reflective marker at the tip throughout the capture volume for about 2-3 minutes. This marker is captured by both the marker-based motion capture system and the video cameras (e.g. the plurality of colour video cameras 144) with the white LEDs on. From the perspective of the marker-based motion capture system, it records a 3D trajectory of the marker. From the perspective of a video camera, it sees a series of dark images with a bright spot which may be extracted as a 2D position on each image.

To extract this 2D position, the algorithm scans throughout the whole image to search for a bright pixel and apply the mean-shift algorithm at that location to make the location converge at the centroid of the bright pixel cluster.

If the camera uses a global-shutter sensor, 2D-3D correspondent pairs are simply collected by linearly interpolating the 3D position from the 3D marker trajectory using the time of the middle of the exposure interval of the video camera frame. Then, applying cv2.calibrateCamera function on that set of correspondence pairs gives the extrinsic camera parameters and also fine-tune the intrinsic camera parameters.

However, this cannot be done on a rolling-shutter camera directly because all the pixel rows are not captured simultaneously. The time of an observed 2D marker on a video frame change according to the row of pixel it is seen. Equation 1 is used to calculate the time of the 2D marker observation and this time is used to linearly interpolating the 3D position from the 3D marker trajectory to form one 2D-3D correspondent (or correspondence) pair. Then, applying cv2.calibrateCamera function on that set of correspondence pairs gives the extrinsic camera parameters and also fine-tune the intrinsic camera parameters.

The explained method works well if there is no other bright or reflective item in the camera field of view. However, that assumption is not very practical because a motion capture environment usually contains a lot of light sources, computer screens, and LEDs from the opposite video cameras. Therefore, extra procedures are required to deal with these noises.

For example, a 5-second video record is done right before the wand-waving step to find the bright pixels in the image and to mask them out in every frame before searching for the marker in the wand-waving record. This removes the static bright area in the camera field of view, but the dynamic noise from moving shiny objects such as a watch or glasses is included in the 2D-3D correspondence pool. To remove those dynamic noises from the pool of 2D-3D correspondence, a method is developed based on Random Sample Consensus (RANSAC) idea to reject outliers from the model fitting. This method assumes that the noises occur less than 5% from all 2D-3D correspondent pair samples so that the majority can form the consensus correctly.

This method is described as follows.

(a) Randomly samples 100 2D-3D correspondence pairs from the pool.

(b) Use that 100 correspondence pairs to calculate camera parameters with cv2.calibrateCamera.

(c) Use the calculated camera parameters to project all the 3D points from all pairs in the pool to observe the Euclidean error between the projection and the 2D observation. The pairs with less than 10 pixels of error are classified as good pairs.

(d) All the good pairs from the latest round of classification are used to calculate camera parameters again with cv2.calibrateCamera.

(e) Repeat step (c) and (d) until the set of good points stays the same in subsequent iterations i.e., the model converges.

If the first 100 samples contain a lot of noisy pairs, the calculated camera parameters would be inaccurate and do not agree with a lot of correspondent pairs in the pool. In this case, the model converges with a small number of good pairs.

On the other hand, if the first 100 samples contain only valid pairs, the calculated camera parameters would be fairly accurate and agree with a large number of valid pairs in the pool. In this case, the number of good pairs expands to cover all the valid points while leaving noisy pairs excluded as they do not agree with the valid consensus.

To make the later case happen, the process (a)-(e) are repeated 200 times to pick the final model with the maximum number of good pairs. From an evaluation, this method of noise removal may reduce the average projection error to sub-pixel level which is ideal for data collection.

Figure 9:
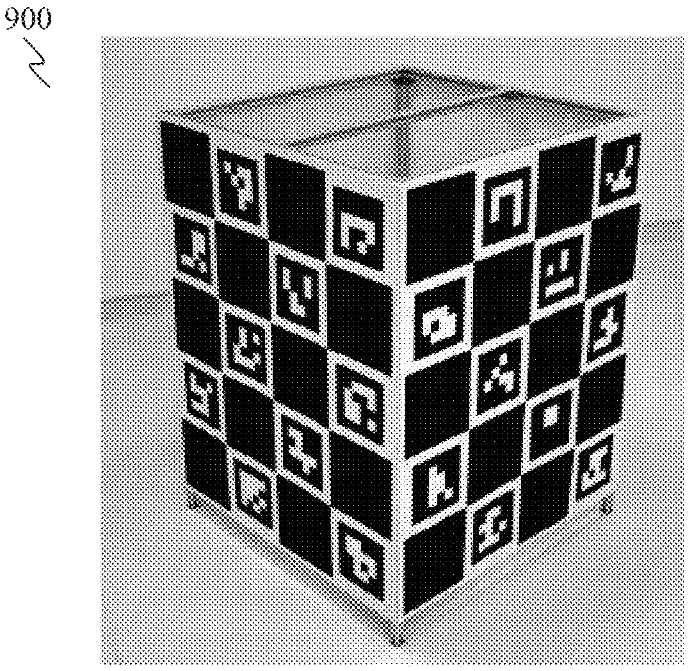
FIG. 9 shows a photograph of an equipment including checkboards for calibrating the system of FIG. 1D, according to one embodiment.

Extrinsic Camera Calibration for System Deployment: In the actual deployment of the system (e.g., the system 160), there is no marker-based motion capture system to provide 3D information of the marker trajectory to collect 2D-3D correspondence for camera calibration. Therefore, an alternative extrinsic calibration method may be used. In case that the cameras are not equipped with LEDs, a checkerboard may be captured by two cameras simultaneously to calculate the relative transformation between them with cv2.StereoCalibrate method. When the relative transformations between all the cameras in the system are known, those extrinsic parameters are fine-tuned again with Leven-berg-Marquardt optimisation to obtain the final results. To facilitate this calibration process (described in similar context to extrinsically calibrating the colour video cameras in the method for predicting 3D locations of virtual markers on a marker-less human or animal subject 120), multiple checkerboards may be used in the same environment by adding unique Aruco markers into the checkerboards 900, seen as Charuco boards in FIG. 9. These Charuco boards may be detected with their board identity using cv2.aruco.estimatePoseCharucoBoard function.

In case that the cameras are equipped with LEDs, it is possible to expand the calibration to be more accurate in a larger volume using a wand with reflective markers and bundle adjustment optimization technique.

Training Data Collection and Preprocessing

This section may be described in similar context with the method for generating a training dataset for keypoint detection 100, and discusses how the dataset is collected and pre-processed before the training. The training data (or training dataset) contains 3 key elements: images from the video camera, positions of 2D keypoints on each image, and the bounding box of the target subject.

Markerset: A set of 40 markers are chosen from a markerset in RRIS's Ability Data protocol (reference made to P. Liang et al., "An asian-centric human movement database capturing activities of daily living," Scientific Data, vol. 7, no. 1, pp. 1-13, 2020). All the clusters are removed as their placements are not consistent across multiple subjects and their large size causes difficulty in the inpainting step later. There are 4 markers on the head (RTEMP, RHEAD, LHEAD, LTEMP), 4 markers on the torso (STER, XPRO, C7, T10), 4 markers on the pelvis (RASIS, LASIS, LPSIS, RPSIS), 7 markers on each upper limb (ACR, HLE, HME, RSP, USP, CAP, HMC2), and 7 markers on each lower limb (FLE, FME, TAM, FAL, FCC, FMT1, FMT5). The marker placement task is standardized according to bone landmarks and most preferably be done by people who are trained.

Marker Projection for Rolling-shutter camera: All the 3D marker trajectories are projected to each video camera with the projection method described in the above section explaining the projection of 3D marker trajectory to the 2D image under the rolling shutter camera model. Results from the 2D projection are the 2D keypoints for the training. For example, reference is made to Step 104 of the method 100.

Marker Removal: The images taken from the video camera always contain visible marker blobs which may cause issues to the learned model during the inference. When the model sees the pattern that the expected position of the keypoints always lands on the gray blobs from the visible markers, the model remembers this pattern and always look for gray blobs as the key features to locate the marker itself. This overfitting may degrade the performance in the actual markerless usage when there is no marker on the body anymore. Therefore, the video data is prepared as if there is no marker on the subject. This may be done by using an image inpainting technique that uses Generative Adversarial Network (GAN) as it replaces the pixel color in the target area by being aware of the surrounding context. In this case, DeepFillv2 is used to remove the marker. To remove the markers, the pixels that are occupied by the marker are listed out. This may be done automatically by taking the 2D projection (e.g. Step 104 of the method 100) and drawing a 2D radius according to the distance between the camera and the marker with some additional margin to cover the base and the shadow of the marker.

Non-subject Removal: With multiple video cameras looking in all directions, it is difficult to avoid non-subject humans in the field of view. As those non-subject humans are not wearing markers, they are not labeled and are interpreted as a background during the training process that may cause confusion in the model. Therefore, those non-subject humans are automatically detected by default human detection from Detectron2 and get blurred with smooth edges.

Bounding Box Formulation: One important piece of information that the training process needs is the 2D bounding box around each human subject. This 2D bounding box in a form of a simple rectangle covers not only all the projected marker positions but also a full silhouette of all body parts. Therefore, the formulation is developed by extending the coverage of each marker by different amounts to the point that it covers adjacent body parts. For example, there is no marker on the finger; therefore, the elbow, the wrist, and the hand markers are used to approximate the possible volume that the finger reaches. Then, those 3D points on the surface of that volume are projected to each camera to approximate the bounding box. For example, reference is made to Step 108 of the method 100.

Neural Network Architecture and Training Framework

Keypoint detection version of Mask-RCNN with Feature Pyramid Network (FPN) as the feature extraction backbone is used as the neural network architecture. As the network is already implemented with PyTorch on Detectron2 project repository, modifications may be done to change the set of keypoints from joint centers to the set of 40 markers (as discussed above in the section of Training Data Collection and Preprocessing, and reference also made to Steps 125 and 124 of the method 120) and allow the training images to be loaded from video files. The data loader module are also modified to use shared memory across all the work processes to reduce the redundancy in the memory utilization and allow the size of the training data to be much larger.

Strategic Triangulation

After the training is done, the model is able to predict the 2D location of all 40 markers from an image of a markerless subject. For example, reference is made to Step 126 of the method 120. In some specific circumstances such as the subject being half-cropped by the camera field of view, some of the markers may not give the location output as the confidence level is too low. For rolling-shutter cameras, the 2D location used for triangulation is the interpolated result between two consecutive frames to obtain the location at the trigger time as described by the above section explaining Interpolation of a 2D marker trajectory at the trigger time under the rolling shutter camera model. If the marker from one of the adjacent frames is not available for interpolation, that camera is to be treated as unavailable for that marker in that frame.

In the ideal situation when the prediction output from all the available cameras are fairly accurate, triangulation of the results from all cameras may be done with Direct Linear Transformation. One 2D location on the image from one camera may be represented by a 3D ray pointing out from the camera origin. Direct Linear Transformation directly calculates a 3D point that is the virtual intersection point of all those rays. In this ideal case, the distance between the 3D point and every ray is not going to be large (i.e., less than 10 cm) and the solution may be easily accepted.

However, in reality, the prediction in the minority of the cameras may be wrong. Sometimes, some cameras may not see the exact position of the wrist because for example, the torso is blocking. Sometimes, some cameras may be confused between the left and the right side of the body. To make the triangulation more robust, the method is to reject the contribution from those cameras that do not agree with the consensus.

The method to triangulate one marker in one specific frame may be done as follows.

(a) List all the available cameras (cameras that are capable of providing the 2D location of the target marker).

(b) Triangulate all the available cameras to get a 3D location. The triangulation may be done with commonly used DLT method. Optionally, if the confidence score of each 2D marker prediction are given, the triangulation method may be significantly enhance with a weighted triangulation formula (see Equation 2) described below in the section on New Weighted Triangulation.

(c) Among the cameras in the available list, identify the camera that gives the maximum distance between the triangulated 3D point and the ray from that camera. If the maximum distance is less than 10 cm the triangulated is accepted. Otherwise, that camera is removed from the list of available cameras.

(d) Repeat steps (b) and (c) until the solution gets accepted. If the number of cameras in the list falls below two, there will be no solution for that marker in this frame.

With this method, the maximum number of triangulation performed per marker per frame is just n−1 where n is the number of cameras. This n−1 calculation is a lot faster than trying all possible combinations of triangulation which require $2^n$−n−1 calculations.

New Weighted Triangulation

It may be common for a neural network that performs 2D keypoint localization to also produce a confidence score associated with each 2D location output. For example, the keypoint detection version of Mask-RCNN produces a heatmap of confidence inside the bounding box for each keypoint. Then, the 2D location with the highest confidence in the heatmap is selected as the answer. In this case, the confidence score at the peak is the associated score for that 2D keypoint prediction. In a normal triangulation, that confidence score is usually ignored. However, the weighted triangulation formula, as discussed below, allows the utilization of the score as the triangulation weight to enhance the triangulation accuracy.

Weighted Triangulation Formula: The triangulated 3D position (P) may be derived as:

$$P = \left(\sum_i w_i Q_i\right)^{-1}\left(\sum_i w_i Q_i C_i\right) \qquad \text{Equation 2}$$

where $$Q_i = I_3 - U_i U_i^T$$

given that $w_i$ is the weight or the confidence score of the $i^{th}$ ray from the $i^{th}$ camera, $C_i$ is the 3D camera location associated with the $i^{th}$ ray, $U_i$ is the 3D unit vector that represents the back-projected direction associated with the $i^{th}$ ray, $I_3$ is the 3×3 identity matrix.

The directional vector ($U_i$) of each back-projected ray is calculated by:—

1) undistorting the 2D observation using cv2.undistortPointsIter to the normalized coordinate
2) forming a 3D directional vector in the camera reference frame $[x\_undistorted, y\_undistorted, 1]^T$
3) rotating the direction to the global reference frame using the current estimate of camera orientation
4) normalizing the vector to get the unit vector ($U_i$).

As this formula is derived by minimizing the weighted sum of square of distance between the triangulated point and all the rays, the prediction with less confidence has lesser influence in the triangulation and allows the triangulated point to be closer to the ray with higher predictive confidence resulting in better overall accuracy.

iii. COMMERCIAL APPLICATIONS

The potential customers of this invention are anyone who wants a non-realtime markerless human motion capture system. They may be scientists who want to study human movements, animators who want to create animation from human movement, or hospitals/clinics that want to produce objective diagnosis from patients' movements.

Advantages in the reduction of time and manpower used to perform motion capture system open an opportunity for clinicians to adopt this technology for objective diagnostic/analysis from patient's movement as it is possible for a patient to perform a short motion capture and get to see the doctor with the analysis result within the same hour or less.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for generating a training dataset for keypoint detection, the method comprising:

based on a plurality of markers captured by an optical marker-based motion capture system, each as a 3D trajectory, wherein each marker is placed on a bone landmark of a human or animal subject or a keypoint of an object, and the human or animal subject or the object substantially simultaneously captured by a plurality of colour video cameras over a period of time as sequences of 2D images and wherein the optical marker-based motion capture system and the plurality of colour video cameras are calibrated, for each marker, projecting the 3D trajectory to each of the 2D images to determine a 2D location in each 2D image;

based on the determined 2D locations of each marker in the sequences of 2D images and an exposure-related time of the plurality of colour video cameras, interpolating a 3D position of each marker and projecting the 3D position to each of the 2D images;

based on the interpolated 3D positions of the plurality of markers and an extended volume derived from two or more of the markers having an anatomical or functional relationship with one another, generating a 2D bounding box around the human or animal subject or the object in each 2D image, wherein the extended volume is obtainable by extending coverage of each of the two or more of the markers by different amounts to a point covering a part of the human or animal subject or the object that is adjacent to the bone landmark or keypoint on which each of the two or more of the markers is placed; and generating the training dataset comprising at least one 2D image selected from the sequences of 2D images, the determined 2D location of each marker in the selected at least one 2D image, and the generated 2D bounding box for the selected at least one 2D image, wherein the plurality of markers each being captured as the 3D trajectory and the human or animal subject or the object being simultaneously captured as the sequences of 2D images over the period of time are coordinated using a synchronized signal communicated by the optical marker-based motion capture system to the plurality of colour video cameras.

2. The method as claimed in claim 1, wherein each marker comprises a retro-reflective marker.

3. The method as claimed in claim 1, further comprising at least one of the following:

prior to the step of projecting the 3D trajectory, identifying the captured 3D trajectory with a label representative of the bone landmark or keypoint on which the marker is placed, wherein for each marker, the label is arranged to be propagated with each determined 2D location such that in the generated training dataset, each determined 2D location of each marker contains the corresponding label, or after the step for projecting the 3D trajectory to each of the 2D images to determine the 2D location in each 2D image, in each 2D image and for each marker, drawing a 2D radius on the determined 2D location according to a distance with a predefined margin between the colour video camera and the marker to form an encircled area, and applying a learning-based context-aware image inpainting technique to the encircled area to remove a marker blob from the 2D location.

4. The method as claimed in claim 3, wherein the learning-based context-aware image inpainting technique comprises a Generative Adversarial Network-based context-aware image inpainting technique.

5. The method as claimed in claim 1, wherein the plurality of colour video cameras is a plurality of global shutter cameras;

wherein the exposure-related time is a middle of exposure time to capture each 2D image using each global shutter camera; and wherein each global shutter camera comprises at least one visible light emitting diodes operable to facilitate a retro-reflective marker coupled to a wand to be perceived as a detectable bright spot, and the plurality of global shutter cameras is precalibrated by:

based on the retro-reflective marker, with the wand being continuously waved, captured by the optical marker-based motion capture system as a 3D trajectory covering a target capture volume, and the retro-reflective marker substantially simultaneously captured by each global shutter camera as a sequence of 2D calibration images for a period of time, for each 2D calibration image, extracting a 2D calibration position of the retro-reflective marker by scanning throughout the entire 2D calibration image to search for a bright pixel and identify a 2D location of the bright pixel, and applying an iterative algorithm at the 2D location of the searched bright pixel to make the 2D location converge at a centroid of a bright pixel cluster;

based on the middle of exposure time in each 2D calibration image and the 3D trajectory, linearly interpolating a 3D calibration position of the retro-reflective marker projected to each of the 2D calibration images;

forming a plurality of 2D-3D correspondence pairs for at least part of the plurality of 2D calibration images, wherein each 2D-3D correspondence pair comprises the converged 2D location and the interpolated 3D calibration position; and applying a camera calibration function on the plurality of 2D-3D correspondence pairs to determine extrinsic camera parameters and to fine-tune intrinsic camera parameters of the plurality of global shutter cameras.

6. The method as claimed in claim 1, wherein the plurality of colour video cameras is a plurality of rolling shutter cameras, and the step of projecting the 3D trajectory to each of the 2D images further comprises:

for each 2D image captured by each rolling shutter camera, determining an intersection time from a point of intersection between a first line connecting the projected 3D trajectory over the period of time and a second line representing a moving middle of exposure time to capture each pixel row of the 2D image;

for each 2D image captured by each rolling shutter camera, based on the intersection time, interpolating a 3D intermediary position to obtain a 3D interpolated trajectory from the sequence of 2D images; and for each marker, projecting the 3D interpolated trajectory to each of the 2D images to determine the 2D location in each 2D image;

wherein the exposure-related time is the intersection time; and wherein each rolling shutter camera comprises at least one visible light emitting diodes operable to facilitate a retro-reflective marker coupled to a wand to be perceived as a detectable bright spot, and the plurality of rolling shutter cameras is precalibrated by:

based on the retro-reflective marker, with the wand being continuously waved, captured by the optical marker-based motion capture system as a 3D trajectory covering a target capture volume, and the retro-reflective marker substantially simultaneously captured by each rolling shutter camera as a sequence of 2D calibration images for a period of time, for each 2D calibration image, extracting a 2D calibration position of the retro-reflective marker by scanning throughout the entire 2D calibration image to search for a bright pixel and identify a 2D location of the bright pixel, and applying an iterative algorithm at the 2D location of the searched bright pixel to make the 2D location converge at a 2D centroid of a bright pixel cluster;

based on observation times of the 2D centroids from the plurality of rolling shutter cameras, interpolating a 3D calibration position from the 3D trajectory covering the target volume, wherein the observation time of each 2D centroid of each bright pixel cluster from each 2D calibration image, i, is calculated by $$T_i+b-e/2+dv,$$

where $T_i$ is a trigger time of the $i^{th}$ 2D calibration image, b is a trigger-to-readout delay experienced by the rolling shutter camera, e is an exposure time set for the rolling shutter camera, d is a line delay experienced by the rolling shutter camera, and v is a pixel row of the 2D centroid of the bright pixel cluster;

forming a plurality of 2D-3D correspondence pairs for at least part of the plurality of 2D calibration images, wherein each 2D-3D correspondence pair comprises the converged 2D location and the interpolated 3D calibration position; and applying a camera calibration function on the plurality of 2D-3D correspondence pairs to determine extrinsic camera parameters and to fine-tune intrinsic camera parameters of the plurality of rolling shutter cameras.

7. A non-transitory computer readable medium comprising instructions which, when executed on a computer, cause the computer to perform a method as claimed in claim 1.

8. A method for predicting 3D locations of virtual markers on a marker-less human or animal subject or a marker-less object, the method comprising:

based on the marker-less human or animal subject or the marker-less object captured by a plurality of colour video cameras as sequences of 2D images, for each 2D image captured by each colour video camera, predicting, using a trained neural network, a 2D bounding box;

for each 2D image, generating, by the trained neural network, a plurality of heatmaps with scores of confidence, wherein each heatmap is for 2D localization of a virtual marker of the marker-less human or animal subject or the marker-less object, and the trained neural network is trained using at least the training dataset generated by a method as claimed in claim 1;

for each heatmap, selecting a pixel with the highest score of confidence, and associating the selected pixel to the virtual marker, thereby determining the 2D location of the virtual marker, wherein for each heatmap, the scores of confidence are indicative of probability of having the associated virtual marker in different 2D locations in the predicted 2D bounding box; and based on the sequences of 2D images captured by the plurality of colour video cameras, triangulating the determined 2D locations to predict a sequence of 3D locations of the virtual marker.

9. The method as claimed in claim 8, wherein the step of triangulating comprises weighted triangulation of the determined 2D locations of the virtual marker based on the respective scores of confidence as weights for triangulation.

10. The method as claimed in claim 9, wherein the weighted triangulation comprises derivation of each predicted 3D location of the virtual marker using a formula:

$$\left(\sum_i w_i Q_i\right)^{-1}\left(\sum_i w_i Q_i C_i\right)$$

where $$Q_i = I_3 - U_i U_i^T$$

given that i is 1, 2, . . . , N,

N being the total number of colour video cameras, $w_i$ is the weight for triangulation or the confidence score of $i^{th}$ ray from $i^{th}$ colour video camera, $C_i$ is a 3D location of the $i^{th}$ colour video camera associated with the $i^{th}$ ray, $U_i$ is a 3D unit vector representing a back-projected direction associated with the i ray, $I_3$ is a 3×3 identity matrix, $$U_i^T$$

represents transpose of $U_i$.

11. The method as claimed in claim 8, wherein the plurality of colour video cameras is one of the following:

a plurality of global shutter cameras; or a plurality of rolling shutter cameras, wherein the method further comprises prior to the step of triangulating the determined 2D locations to predict the sequence of 3D locations of the virtual marker, determining an observation time for each rolling shutter camera based on the determined 2D locations in two consecutive 2D images, wherein the observation time is calculated by $T_i$+b−e/2+dv, where $T_i$ is a trigger time of each of the two consecutive 2D images, b is a trigger-to-readout delay of the rolling shutter camera, e is an exposure time set for the rolling shutter camera, d is a line delay of the rolling shutter camera, and v is a pixel row of the 2D location in each of the two consecutive 2D images; and based on the observation time, interpolating a 2D location of the virtual marker at the trigger time, wherein the step of triangulating the determined 2D locations comprises triangulating the interpolated 2D locations derived from the plurality of rolling shutter cameras.

12. The method as claimed in claim 8, further comprising extrinsically calibrating the plurality of colour video cameras by one of the following:

based on one or more checkerboards simultaneously captured by the plurality of colour video cameras, wherein the one or more checkboards comprises unique markings, for every two of the plurality of colour video cameras, calculating a relative transformation between the two colour video cameras; and when the plurality of colour video cameras have the calculated relative transformations, applying an optimization function to fine-tune extrinsic camera parameters of the plurality of colour video cameras; or based on retro-reflective markers, wherein each colour video camera comprises at least one visible light emitting diodes operable to facilitate the retro-reflective markers coupled to a wand to be perceived as detectable bright spots, with the wand being continuously waved, captured by the plurality of colour video cameras as sequences of 2D calibration images, applying an optimization function to the captured 2D calibration images to fine-tune extrinsic camera parameters of the plurality of colour video cameras.

13. A system for generating a training dataset for keypoint detection, the system comprising:

an optical marker-based motion capture system configured to capture a plurality of markers over a period of time, wherein each marker is placed on a bone landmark of a human or animal subject or a keypoint of an object, and is captured as a 3D trajectory;

a plurality of colour video cameras configured to capture the human or animal subject or the object over the period of time as sequences of 2D images, wherein the optical marker-based motion capture system and the plurality of colour video cameras are calibrated;

a computer configured to:

receive the sequences of 2D images captured by the plurality of colour video cameras and the 3D trajectories captured by the optical marker-based motion capture system; and a synchronization pulse generator in communication with the optical marker-based motion capture system and the plurality of colour video cameras, wherein the computer is further configured to:

for each marker, project the 3D trajectory to each of the 2D images to determine a 2D location in each 2D image;

based on the determined 2D locations of each marker in the sequences of 2D images and an exposure-related time of the plurality of colour video cameras, interpolate a 3D position of each marker projected to each of the 2D images;

based on the interpolated 3D positions of the plurality of markers and an extended volume derived from two or more of the markers having an anatomical relationship or functional relationship with one another, generate a 2D bounding box around the human or animal subject or the object in each 2D image, wherein the extended volume is obtainable by extending coverage of each of the two or more of the markers by different amounts to a point covering a part of the human or animal subject or the object that is adjacent to the bone landmark or keypoint on which each of the two or more of the markers is placed; and generate the training dataset comprising at least one 2D image selected from the sequences of 2D images, the determined 2D location of each marker in the selected at least one 2D image, and the generated 2D bounding box for the selected at least one 2D image, and the synchronization pulse generator is configured to receive a synchronization signal from the optical marker-based motion capture system for coordinating the human or animal subject or the object to be simultaneously captured by the plurality of colour video cameras.

14. The system as claimed in claim 13, wherein the optical marker-based motion capture system comprises a plurality of infrared cameras; and wherein the plurality of colour video cameras and the plurality of infrared cameras are arranged spaced apart from one another and at least alongside a path to be taken by the human or animal subject or the object, or at least substantially surrounding a capture volume of the human or animal subject or the object.

15. The system as claimed in claim 13, wherein the 3D trajectory is identifiable with a label representative of the bone landmark or keypoint on which the marker is placed; and wherein for each marker, the label is arranged to be propagated with each determined 2D location such that in the generated training dataset, each determined 2D location of each marker contains the corresponding label.

16. The system as claimed in claim 13, wherein the computer is further configured to, in each 2D image, draw a 2D radius on the determined 2D location for each marker according to a distance with a predefined margin between the colour video camera and the marker to form an encircled area, and to apply a learning-based context-aware image inpainting technique to the encircled area to remove a marker blob from the 2D location.

17. The system as claimed in claim 13, wherein the plurality of colour video cameras is a plurality of global shutter cameras, or wherein the plurality of colour video cameras is a plurality of rolling shutter cameras, and the computer is further configured to:

for each 2D image captured by each rolling shutter camera, determine an intersection time from a point of intersection between a first line connecting the projected 3D trajectory over the period of time and a second line representing a moving middle of exposure time to capture each pixel row of the 2D image;

for each 2D image captured by each rolling shutter camera, based on the intersection time, interpolate a 3D intermediary position to obtain a 3D interpolated trajectory from the sequence of 2D images; and for each marker, project the 3D interpolated trajectory to each of the 2D images to determine the 2D location in each 2D image.

18. A system for predicting 3D locations of virtual markers on a marker-less human or animal subject or a marker-less object, the system comprising:

a plurality of colour video cameras configured to capture the marker-less human or animal subject or the marker-less object as sequences of 2D images; and a computer configured to:

receive the sequences of 2D images captured by the plurality of colour video cameras;

for each 2D image captured by each colour video camera, predict, using a trained neural network, a 2D bounding box;

for each 2D image, generate, using the trained neural network, a plurality of heatmaps with scores of confidence, wherein each heatmap is for 2D localization of a virtual marker of the marker-less human or animal subject or the marker-less object, and the trained neural network is trained using at least the training dataset generated by a method as claimed in claim 1;

for each heatmap, select a pixel with the highest score of confidence, and associate the selected pixel to the virtual marker to determine the 2D location of the virtual marker, wherein for each heatmap, the scores of confidence are indicative of probability of having the associated virtual marker in different 2D locations in the predicted 2D bounding box; and based on the sequences of 2D images captured by the plurality of colour video cameras, triangulate the respective determined 2D locations to predict a sequence of 3D locations of the virtual marker.

19. The system as claimed in claim 18, wherein the plurality of colour video cameras are arranged spaced apart from one another and operable along at least part of a walkway to a medical practioner's room such that when the marker-less human or animal subject walks along the walkway and into the medical practioner's room, the sequences of 2D images captured by the plurality of colour video cameras are processed by the system to predict the 3D locations of the virtual markers on the marker-less human or animal subject.

* * * * *